US012682854B2

(12) United States Patent
Choi et al.

(10) Patent No.: US 12,682,854 B2
(45) Date of Patent: Jul. 14, 2026

(54) DISPLAY DEVICE AND METHOD OF DRIVING SAME

(71) Applicant: LG Display Co., Ltd., Seoul (KR)

(72) Inventors: Young Jun Choi, Paju-si (KR); Min Kyu Chun, Paju-si (KR); Young Mi Kim, Paju-si (KR); Jeong Hyeon Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 69 days.

(21) Appl. No.: 18/969,104

(22) Filed: Dec. 4, 2024

(65) Prior Publication Data

US 2025/0218396 A1 Jul. 3, 2025

(30) Foreign Application Priority Data

Dec. 29, 2023 (KR) ........................ 10-2023-0197315
Sep. 26, 2024 (KR) ........................ 10-2024-0130822

(51) Int. Cl.
*G09G 3/3266* (2016.01)

(52) U.S. Cl.
CPC ... *G09G 3/3266* (2013.01); *G09G 2300/0408* (2013.01); *G09G 2310/0291* (2013.01); *G09G 2320/043* (2013.01); *G09G 2330/021* (2013.01)

(58) Field of Classification Search
CPC .................................................... G09G 3/3266
See application file for complete search history.

(56) References Cited

U.S. PATENT DOCUMENTS

2018/0315369 A1* 11/2018 Pyun .................... G09G 3/3677
2019/0362661 A1* 11/2019 Saito ....................... G09G 3/006
2023/0074341 A1* 3/2023 Youn .................... G09G 3/3266
2024/0194138 A1* 6/2024 Kim ..................... G09G 3/3233
2026/0004688 A1* 1/2026 Lee ........................ G09G 3/006

* cited by examiner

*Primary Examiner* — William Boddie
*Assistant Examiner* — Andrew B Schnirel
(74) *Attorney, Agent, or Firm* — Fenwick & West LLP

(57) ABSTRACT

A display device includes a display panel on which an active area including sub-pixels is formed, a first GIP and a second GIP disposed on both sides of the active area, each including a buffer circuit including buffer TFTs and outputting a scan signal to a scan line to which the sub-pixels are connected through the buffer circuit, a sensing switch configured to select a signal input/output to/from the buffer circuit, a sensing unit configured to control the sensing switch to sense a threshold voltage of a buffer TFT of the second GIP connected to the scan line on the basis of a charged voltage of the scan line charged by the scan signal output from the first GIP, and a compensation unit configured to generate a compensation value for a high-potential voltage applied to a relevant GIP depending on the sensed threshold voltage of the buffer TFT.

16 Claims, 22 Drawing Sheets

Scan Line Charging

DISPLAY DEVICE AND METHOD OF DRIVING SAME

CROSS-REFERENCE TO RELATED APPLICATION

This application claims the priority from Republic of Korea Patent Application No. 10-2023-0197315, filed on Dec. 29, 2023, and Republic of Korea Patent Application No. 10-2024-0130822, filed on Sep. 26, 2024, each of which is hereby incorporated by reference in its entirety.

BACKGROUND

Field

The present disclosure relates to a display device and a method of driving the same.

Description of Related Art

As information technology develops, the market for display devices, which are communication media between users and information, is growing. Accordingly, display devices such as a light emitting display (LED) device, a quantum dot display (QDD) device, and a liquid crystal display (LCD) device are increasingly used.

Display devices may include a display panel including sub-pixels, a driver outputting driving signals for driving the display panel, and a power supply generating driving power. The driver includes a gate driver for supplying gate signals such as a scan signal and an emission control signal to the display panel, and a data driver for supplying data signals to the display panel.

The gate driver of such a display device may be composed of a plurality of thin film transistors (TFTs). Since the electrical characteristics of the TFT change as operation time passes, appropriate compensation according to the changed electrical characteristics is required in order to improve the operation stability. Therefore, technology for accurately sensing the electrical characteristics of the TFTs constituting the gate driver is required.

SUMMARY

An object of embodiments of the present disclosure is to provide a display device and a method of driving the same for improving operation stability by accurately sensing and compensating for electrical characteristics of TFTs constituting a gate driver of the display device.

To achieve these objects and other advantages and in accordance with the purpose of the present disclosure, as embodied and broadly described herein, a display device includes a display panel on which an active area including sub-pixels is formed, a first gate-in-panel (GIP) and a second GIP disposed on both sides of the active area, each including a buffer circuit composed of a plurality of buffer thin film transistors (TFTs) and outputting a scan signal to a scan line to which the sub-pixels are connected through the buffer circuit, a sensing switch configured to select a signal input/output to/from the buffer circuit, a sensing unit configured to control the sensing switch to sense a threshold voltage of a buffer TFT of the second GIP connected to the scan line on the basis of a charged voltage of the scan line charged by the scan signal output from the first GIP, and a compensation unit configured to generate a compensation value for a high-potential voltage GVDD applied to a relevant GIP depending on the sensed threshold voltage of the buffer TFT.

The sensing unit may control the sensing switch such that the buffer TFT of the second GIP performs a source following operation based on the charged voltage of the scan line to sense the threshold voltage of the buffer TFT.

The sensing unit may sense the threshold voltage of the buffer TFT of the second GIP when the first GIP operates in a driving mode in which the first GIP outputs the scan signal.

The buffer circuit may include a pull-up buffer TFT controlled by a Q node voltage input to a gate electrode to output a scan signal through a first electrode, and a pull-down buffer TFT controlled by a QB node voltage input to a gate electrode to output a scan signal through a first electrode, and output the scan signal in accordance with a clock signal.

The sensing switch may include a pull-up sensing switch for connecting a second electrode of the pull-up buffer TFT to one of an initialization line through which an initialization voltage is transmitted, a clock line through which the clock signal is transmitted, and a sensing line through which a sensing value is obtained or electrically floating the second electrode under the control of the sensing unit, and a pull-down sensing switch for connecting a second electrode of the pull-down buffer TFT to a low-potential voltage line through which a low-potential voltage is transmitted or a sensing line through which a sensing value is obtained or electrically floating the second electrode under the control of the sensing unit.

The sensing unit may connect a second electrode of a pull-up buffer TFT of the second GIP connected to the scan line to the initialization line while the first GIP outputs the scan signal to the scan line, float the second electrode of the pull-up buffer TFT of the second GIP when output of the scan signal is completed, and then obtain a threshold voltage of the pull-up buffer TFT of the second GIP according to a voltage of the second electrode of the pull-up buffer TFT of the second GIP, sensed by connecting the second electrode of the pull-up buffer TFT of the second GIP to the sensing line.

The pull-up buffer TFT of the second GIP may perform a source following operation based on the charged voltage of the scan line reflected in a first electrode.

The pull-up buffer TFT of the second GIP may receive the high-potential voltage GVDD applied to a gate electrode and operate in a saturation region.

The sensing unit may connect a second electrode of a pull-down buffer TFT of the second GIP connected to the scan line to the low-potential voltage line while the first GIP outputs the scan signal to the scan line, float the second electrode of the pull-down buffer TFT of the second GIP when output of the scan signal is completed, and then obtain a threshold voltage of the pull-down buffer TFT of the second GIP according to a voltage of the second electrode of the pull-down buffer TFT of the second GIP, sensed by connecting the second electrode of the pull-down buffer TFT of the second GIP to the sensing line.

The pull-down buffer TFT of the second GIP may perform a source following operation based on the charged voltage of the scan line reflected in a first electrode.

The sensing unit may connect a second electrode of a pull-up buffer TFT of the first GIP to the clock line and connect a second electrode of a pull-down buffer TFT of the first GIP to the low-potential voltage line while the first GIP outputs the scan signal to the scan line.

In another embodiment of the present disclosure, a method of driving a display device including a display panel on which an active area including sub-pixels is formed, a first GIP and a second GIP disposed on both sides of the display panel, each including a buffer circuit composed of a plurality of buffer TFTs and outputting a scan signal to a scan line to which the sub-pixels are connected through the buffer circuit includes outputting a scan signal to a scan line from the first GIP, sensing a threshold voltage of a buffer TFT of the second GIP connected to a relevant scan line on the basis of a charged voltage of the scan line charged by the scan signal, and generating a correction value for a high-potential voltage GVDD applied to a relevant GIP depending on the sensed threshold voltage of the buffer TFT.

The buffer circuit may include a pull-up buffer TFT controlled by a Q node voltage input to a gate electrode to output a scan signal through a first electrode, and a pull-down buffer TFT controlled by a QB node voltage input to a gate electrode to output a scan signal through a first electrode.

The sensing a threshold voltage of a buffer TFT of the second GIP may include applying an initialization voltage to a second electrode of a pull-up buffer TFT of the second GIP connected to the scan line while the first GIP outputs the scan signal to the scan line, floating the second electrode of the pull-up buffer TFT of the second GIP when output of the scan signal is completed, and obtaining a threshold voltage of the pull-up buffer TFT of the second GIP according to a voltage of the second electrode of the pull-up buffer TFT of the second GIP, sensed by connecting the second electrode of the pull-up buffer TFT of the second GIP to a sensing line.

The sensing a threshold voltage of a buffer TFT of the second GIP may include applying a low-potential voltage to a second electrode of a pull-down buffer TFT of the second GIP connected to the scan line while the first GIP outputs the scan signal to the scan line, floating the second electrode of the pull-down buffer TFT of the second GIP when output of the scan signal is completed, and obtaining a threshold voltage of the pull-down buffer TFT of the second GIP according to a voltage of the second electrode of the pull-down buffer TFT of the second GIP, sensed by connecting the second electrode of the pull-down buffer TFT of the second GIP to a sensing line.

The outputting a scan signal to a scan line from the first GIP may include connecting a second electrode of a pull-up buffer TFT of the first GIP to a clock line and connecting a second electrode of a pull-down buffer TFT of the first GIP to a low-potential voltage line.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
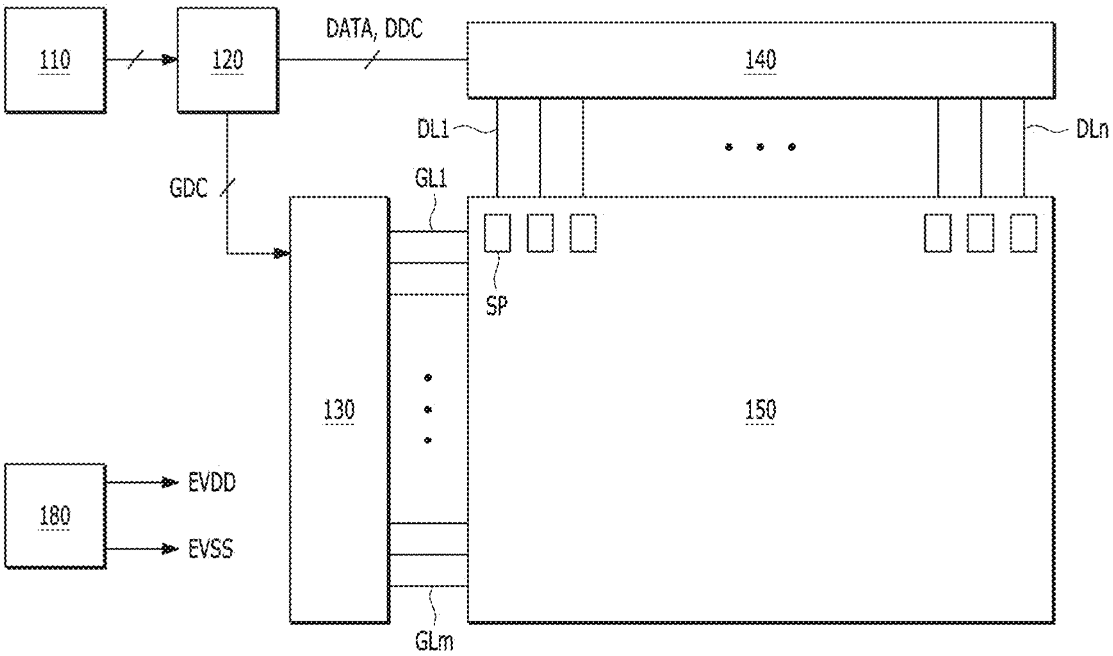
FIG. 1 is a block diagram schematically showing a configuration of a display device, according to one or more embodiments of the present disclosure.

The advantages and features of the present disclosure and the way of attaining the same will become apparent with reference to embodiments described below in detail in conjunction with the accompanying drawings. The present disclosure, however, is not limited to the embodiments disclosed hereinafter and may be embodied in many different forms. Rather, these exemplary embodiments are provided so that this disclosure will be through and complete and will fully convey the scope to those skilled in the art.

The shapes, sizes, ratios, angles, numbers, and the like, which are illustrated in the drawings in order to describe various embodiments of the present disclosure, are merely given by way of example, and therefore, the present disclosure is not limited to the illustrations in the drawings. The same or extremely similar elements are designated by the same reference numerals throughout the specification. In the present disclosure, when the terms "comprise", "include", and the like are used, other elements may be added unless the term "only" is used. An element described in the singular form is intended to include a plurality of elements unless the context clearly indicates otherwise.

In the interpretation of constituent elements included in the various embodiments of the present disclosure, the constituent elements are interpreted as including an error range even if there is no explicit description thereof.

In the description of the various embodiments of the present disclosure, when describing positional relationships, for example, when the positional relationship between two parts is described using "on", "above", "below", "beside", or the like, one or more other parts may be located between the two parts unless the term "directly" or "closely" is used.

Although terms such as, for example, "first" and "second" may be used to describe various elements, these terms are merely used to distinguish the same or similar elements from each other. Therefore, in the present disclosure, an element modified by "first" may be the same as an element modified by "second" within the technical scope of the present disclosure unless otherwise mentioned.

A display device according to the present disclosure may be implemented as a television receiver, a video player, a personal computer (PC), a home theater, an automobile electric device, a smartphone, etc., but is not limited thereto. The display device according to the present disclosure may be implemented as a light emitting display device, a quantum dot display device, a liquid crystal display device, etc. However, as an example, a display device that directly emits light based on an inorganic light-emitting diode or an organic light-emitting diode will be described below for convenience of description.

The same or extremely similar elements are designated by the same reference numerals throughout the specification. In addition, in the description of the present disclosure, a detailed description of related known technologies will be omitted when it may make the subject matter of the present disclosure rather unclear.

Figure 2:
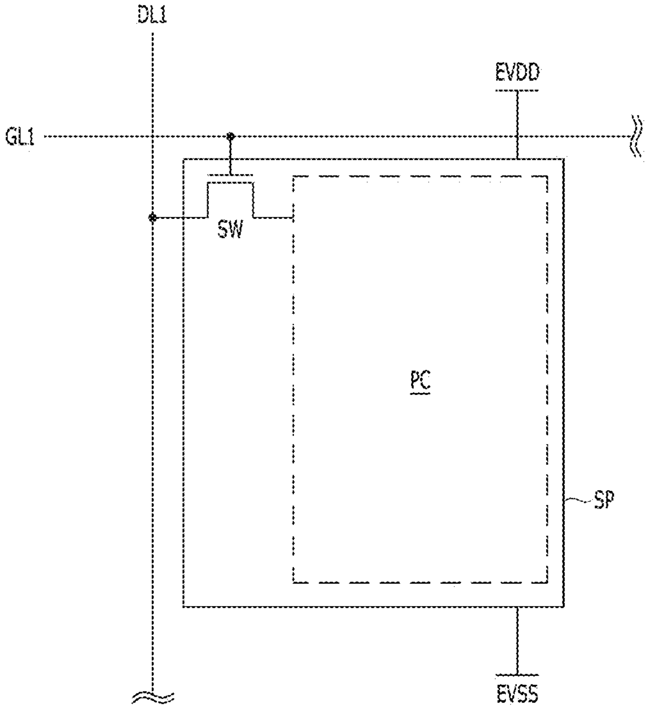
FIG. 2 is a diagram briefly showing a subpixel of FIG. 1, according to one or more embodiments of the present disclosure.
Figure 3:
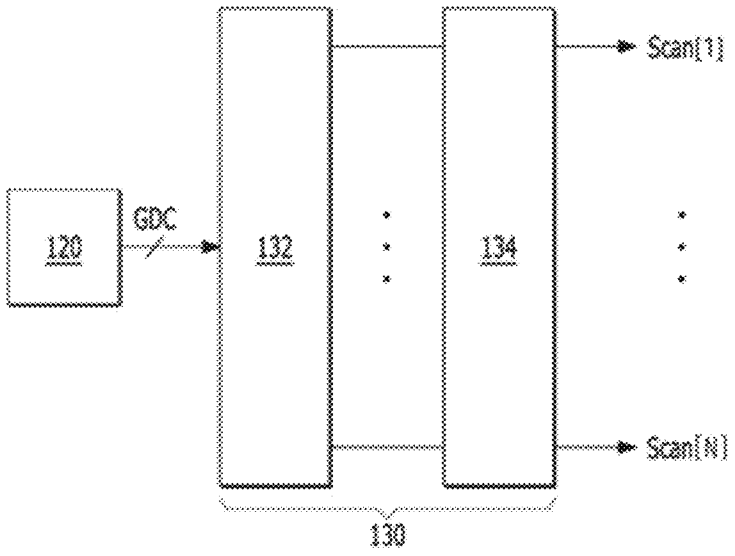
FIG. 3 is a block diagram schematically showing a configuration of the gate driving circuit of FIG. 1, according to one or more embodiments of the present disclosure.

FIG. 1 is a block diagram schematically showing a configuration of a display device, FIG. 2 is a diagram briefly showing a subpixel of FIG. 1, and FIG. 3 is a block diagram schematically showing a configuration of a gate driver of FIG. 1.

As shown in FIG. 1 to FIG. 3, the display device may include an image provider 110, a timing controller 120, a gate driver 130, a data driver 140, a display panel 150, and a power supply 180.

The image provider 110 may output various driving signals in addition to image data signals supplied from the outside or image data signals stored in an internal memory. The image provider 110 may supply data signals and various driving signals to the timing controller 120.

The timing controller 120 may output a gate timing control signal GDC for controlling an operation timing of the gate driver 130, a data timing control signal DDC for controlling an operation timing of the data driver 140, and various synchronization signals (a vertical synchronization signal Vsync and a horizontal synchronization signal Hsync). The timing controller 120 may supply a data signal DATA supplied from the image provider 110 along with the data timing control signal DDC to the data driver 140. The timing controller 120 may be formed as an integrated circuit IC and mounted on a printed circuit board, but is not limited thereto.

The power supply 180 may convert power supplied from the outside into high-voltage first power and low-voltage second power under the control of the timing controller 120 and output the first power and the second power through a first power line EVDD and a second power line EVSS. The power supply 180 may generate and output gate voltages including a gate high voltage and a gate low voltage required to drive the gate driver 130 and a voltage required to drive the data driver 140 in addition to the first power and the second power.

The data driver 140 may sample and latch the data signal DATA in response to the data timing control signal DDC supplied from the timing controller 120, convert the digital data signal into an analog data voltage on the basis of a gamma reference voltage, and output the analog data voltage. The data driver 140 may supply a data voltage to subpixels included in the display panel 150 through data lines DL1 to DLn. The data driver 140 may be formed as an IC and mounted on the display panel 150 or on a printed circuit board, but is not limited thereto.

The display panel 150 may include a plurality of subpixels SP disposed at intersections of gate lines GL and data lines DL arranged in a matrix form. As shown in FIG. 2, one subpixel SP may be connected to the first data line DL1, the first gate line GL1, the first power line EVDD, and the second power line EVSS. The first data line DL1 is a line through which a data voltage is transmitted, the first gate line GL1 is a line through which a scan signal is transmitted, the first power line EVDD is a line through which the first power is transmitted, and the second power line EVSS is a line through which the second power is transmitted. One subpixel SP may include a switching transistor SW that transmits a data voltage input through a data line DL in response to a scan signal input through a gate line GL, and a pixel circuit PC that emits light in response to the data voltage. The pixel circuit PC may include a driving transistor that generates a driving current, an organic light emitting diode (OLED) that emits light in response to the driving current, and the like. An array of subpixels SP arranged on the same gate line is referred to as one horizontal line. The subpixels SP of the same horizontal line are turned on by the same scan signal and receive a data voltage input to the data line connected to each subpixel SP.

The gate driver 130 may supply at least one scan signal to subpixels included in the display panel 150 through gate lines GL1 to GLm. The gate driver 130 may be formed in the form of an IC or may be directly formed on the display panel 150 in a gate-in-panel (GIP) structure. The gate driver 130 formed in the GIP structure may be disposed at one edge of the display panel 150 or may be divided and disposed at two edges of the display panel 150.

FIG. 3 is a block diagram schematically showing a configuration of the gate driver 130.

Referring to FIG. 3, the gate driver 130 may output scan signals Scan[1] to Scan[N] in response to the gate timing control signal GDC supplied from the timing controller 120. The gate driver 130 may be provided with a high-potential voltage GVDD and a low-potential gate voltage GVSS and output the scan signals Scan[1] to Scan[N] in accordance with the gate timing control signal GDC.

The gate driver 130 may include a scan signal generation circuit 132 and a buffer circuit 134.

The scan signal generation circuit 132 may generate one or more clock signals and a start pulse signal based on signals output from the timing controller 120. The scan signal generation circuit 132 may generate the scan signals Scan[1] to Scan[N] to be supplied to the gate lines by shifting the scan pulse signal in accordance with a clock timing using a shift register.

The buffer circuit 134 may output the scan signals Scan[1] to Scan[N] output from the scan signal generation circuit 132 to the gate lines GL1 to GLm. The buffer circuit 134 may sequentially output the scan signals Scan[1] to Scan[N] in synchronization with a scan clock signal output from an IC in the timing controller 120 or the gate driver 130.

Figure 4:
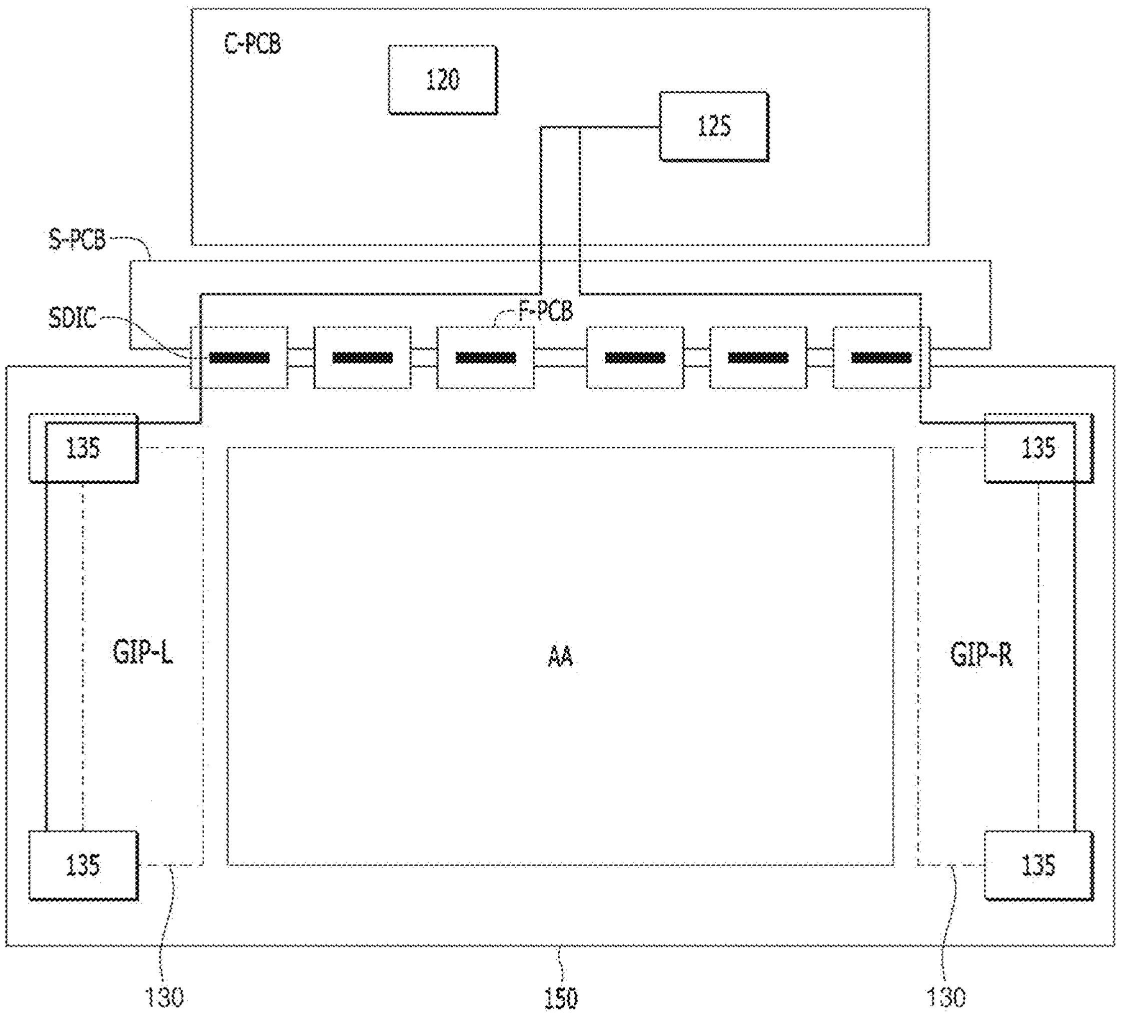
FIG. 4 and FIG. 5 are diagrams illustrating a display device according to one or more embodiments of the present disclosure.
Figure 5:
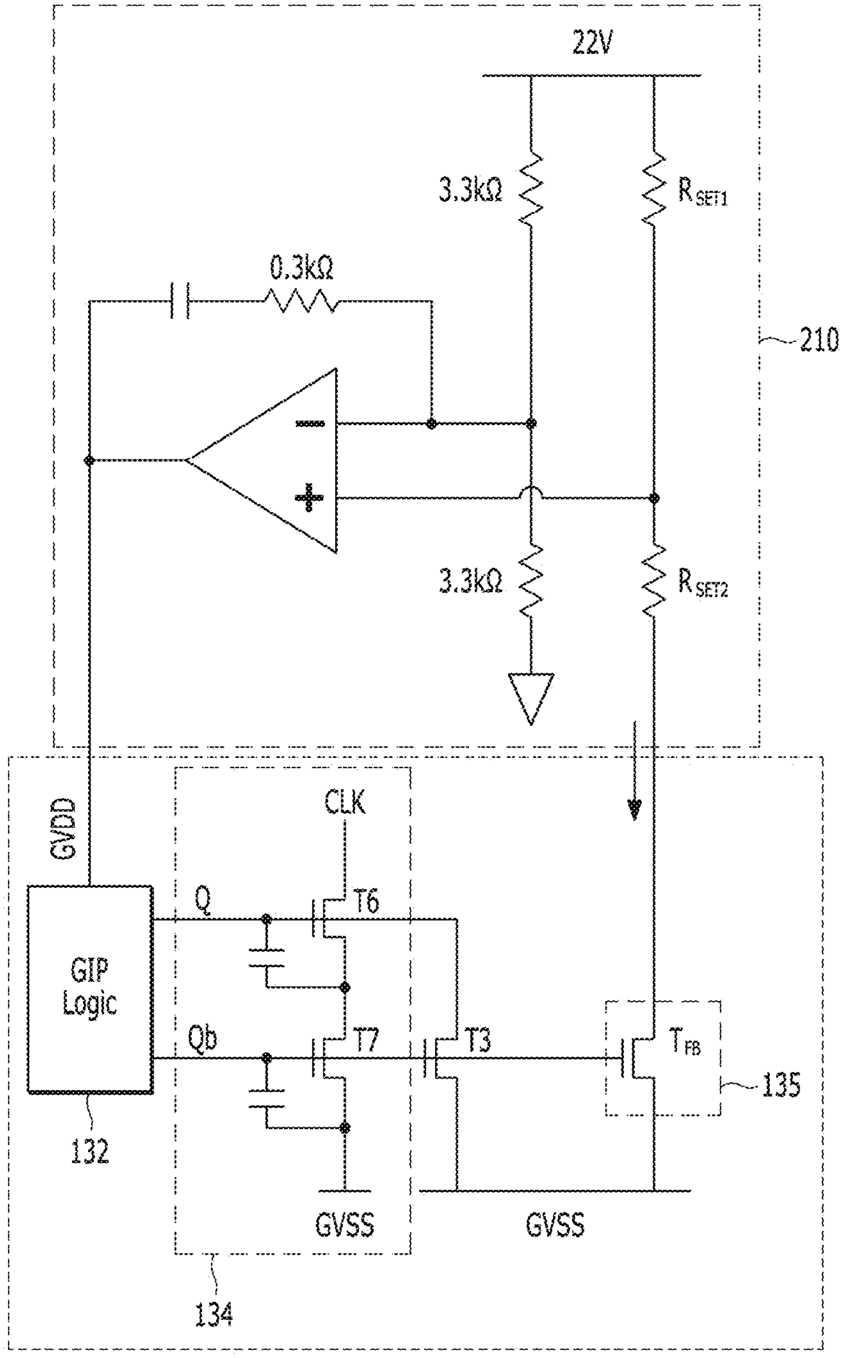

FIG. 4 and FIG. 5 are diagrams schematically illustrating a display device according to a comparative example.

As illustrated in FIG. 4, a display device according to a comparative example may include a first circuit board C-PCB, a second circuit board S-PCB, a third circuit board F-PCB, and a display panel 150. The first circuit board C-PCB may include a timing controller 120 and a GVDD varying circuit 125. The second circuit board S-PCB may electrically connect the first circuit board C-PCB and the third circuit board F-PCB. The third circuit board F-PCB may include a data driver SDIC mounted in an IC form and may electrically connect the second circuit board S-PCB and the display panel 150.

An active area AA for displaying an image using a plurality of sub-pixels may be formed on the display panel 150. On both sides of the active area AA, a first GIP GIP_L and a second GIP GIP_R may be formed. A mock TFT 135 for sensing degrees of deterioration of buffer TFTs of the first GIP GIP_L and the second GIP GIP_R may be formed adjacent to the first GIP GIP_L and the second GIP GIP_R.

Referring to FIG. 5, the first GIP GIP_L and the second GIP GIP_R may include a GIP Logic 132 that generates a scan signal and a buffer circuit 134. The first GIP GIP_L and the second GIP GIP_R may receive GVDD (high-potential gate driving voltage) and GVSS (low-potential gate driving voltage) which are DC voltages, and output a scan signal. In order to reduce the stress caused by GVDD in this GIP structure, the GVDD varying circuit 125 that varies the level of GVDD in response to variation in the threshold voltage Vth of a TFT constituting the buffer circuit 134 is applied.

The buffer circuit 134 may include a pull-up buffer TFT T6 and a pull-down buffer TFT T7. In order to sense variations in the threshold voltages Vth of the pull-up buffer TFT T6 and the pull-down buffer TFT T7, the mock TFT 135 (TFB) may be formed on the edge of the panel 150.

Four mock TFTs 135 (TFB) may be formed on the edge of the panel corresponding to the positions where the first GIP GIP_L and the second GIP GIP_R are formed. The mock TFT 135 (TFB) may have a gate electrode connected to a QB node Qb of the scan signal generation circuit 132 (GIP Logic), a first electrode connected to a Q node Q, and a second electrode connected to a low-potential voltage line through which the low-potential voltage GVSS is transmitted. Accordingly, the threshold voltage of the mock TFT 135 (TFB) can be measured and applied as threshold voltage information of the TFTs constituting the buffer circuit 134.

The GVDD varying circuit 125 can vary the high-potential voltage GVDD supplied to the first GIP GIP_L and the second GIP GIP_R according to the threshold voltage of the mock TFT 135. The GVDD varying circuit 125 may be implemented based on a comparator. The GVDD varying circuit 125 may be configured to determine a voltage that allows the same current to flow in the mock TFT 135 (TFB) as the GVDD by utilizing the equipotential characteristics of an OP-AMP. That is, the GVDD varying circuit for maintaining a constant amount of current may be configured by connecting the mock TFT 135 connected to the gate driver GIP_L and GIP_R to an OP-AMP. In this manner, the display device according to the comparative example measures a threshold voltage variation of the mock TFT 135 (TFB) and applies the same as threshold voltage information of the buffer TFT.

Compared to the display device according to the comparative example, the display device according to an embodiment of the present disclosure can directly sense the threshold voltage of the buffer TFT included in the buffer circuit by driving the buffer TFT in a source following manner. In the display device according to the embodiment of the present disclosure, in which the first GIP GIP_L and the second GIP GIP_R are formed on both sides of the active area, when the GIP on one side outputs a scan signal, the threshold voltage of the buffer TFT on the GIP on the other side can be sensed. The display device according to the embodiment of the present disclosure can sense the threshold voltage by driving the buffer TFT of the GIP on the other side connected to a scan line charged by the scan signal output from the GIP on one side in a source following manner on the basis of the charged voltage of the scan line.

Figure 6:
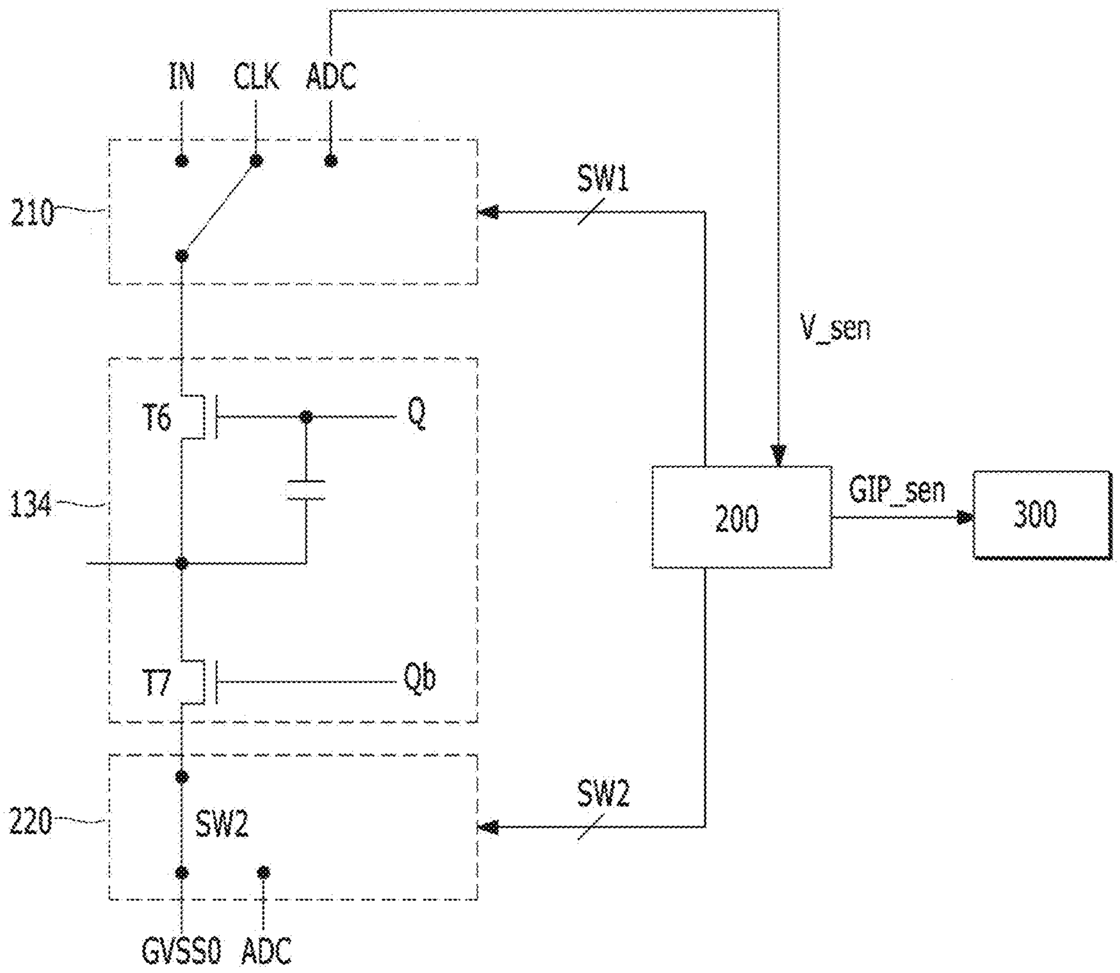
FIG. 6 is a diagram illustrating some components of a display device according to an embodiment of the present disclosure.

FIG. 6 is a diagram illustrating a configuration for sensing the threshold voltage of a buffer TFT in the display device according to the embodiment of the present disclosure.

Referring to FIG. 6, the display device according to the embodiment of the present disclosure may include a buffer circuit 134, a pull-up sensing switch 210, a pull-down sensing switch 220, a sensing unit 200, and a compensation unit 300.

The buffer circuit 134 may include a pull-up buffer TFT T6 and a pull-down buffer TFT T7. The pull-up buffer TFT T6 may be controlled by a Q node voltage input to the gate electrode and output a scan signal through the first electrode. The pull-down buffer TFT T7 may be controlled by a QB node voltage input to the gate electrode and output a scan signal through the first electrode. The buffer circuit 134 may output the scan signal in accordance with a scan clock signal.

The pull-up sensing switch 210 may connect the second electrode of the pull-up buffer TFT T6 to one of an initialization line IN through which an initialization voltage is transmitted, a clock line CLK through which a clock signal is transmitted, and a sensing line ADC through which a sensing value is obtained according to a first switching control signal SW1 applied by the sensing unit 200. If the pull-up sensing switch 210 is not connected to any line, the second electrode of the pull-up buffer TFT T6 can be electrically floated. The pull-up buffer TFT T6 may output a scan signal according to the Q node voltage when the second electrode thereof is connected to the clock line CLK. When the threshold voltage of the pull-up buffer TFT T6 is sensed, the Q node voltage at a turn-on level may be applied to the gate electrode of the pull-up buffer TFT T6. When the threshold voltage is sensed, the Q node voltage at the turn-on level is applied to the gate electrode of the pull-up buffer TFT T6, and the second electrode of the pull-up buffer TFT T6 may be connected to the sensing line ADC after being connected to the initialization line IN and then floated.

The pull-down sensing switch 220 may connect the second electrode of the pull-down TFT T7 to a low-potential voltage line GVSS through which a low-potential voltage is transmitted or the sensing line ADC through which a sensing value is obtained according to a second switching control signal SW2 applied by the sensing unit 200. If the pull-down sensing switch 220 is not connected to any line, the second electrode of the pull-down buffer TFT T7 may be electrically floated. At the time of outputting a scan signal, the second electrode of the pull-down TFT T7 is connected to the low-potential voltage line GVSS to output the scan signal according to the Qb node voltage. When the threshold voltage of the pull-down TFT T7 is sensed, a Qb node voltage at a turn-on level may be applied to the gate electrode of the pull-down TFT T7. At the time of sensing the threshold voltage, the Qb node voltage at the turn-on level is applied to the gate electrode of the pull-down TFT T7, and the second electrode of the pull-up buffer TFT T6 can be floated and then connected to the sensing line ADC. The sensing unit 200 may obtain threshold voltage sensing information V_sen of the pull-up buffer TFT T6 and the pull-down buffer TFT T7 of the buffer circuit 134 by controlling the pull-up sensing switch 210 and the pull-down sensing switch 220.

The sensing unit 200 may connect the second electrode of the pull-up buffer TFT T6 to the clock line CLK and connect the second electrode of the pull-down TFT T7 to the low-potential voltage line GVSS when the GIP operates in a driving mode for outputting a scan signal. The sensing unit 200 may connect the second electrodes of the pull-up buffer TFT T6 and the pull-down TFT T7 of the GIP to the initialization line IN or float the same and then connect the same to the sensing line ADC when the GIP operates in a sensing mode for threshold voltage sensing. As described above, the sensing unit 200 can control the pull-up sensing switch 210 and the pull-down sensing switch 220 such that one of the two GIPs operates in the driving mode and the other GIP operates in the sensing mode.

When sensing the threshold voltage of the pull-up buffer TFT T6, the sensing unit 200 may connect the second electrode of the pull-up buffer TFT T6 to the initialization line IN while the scan line is charged by the scan signal output from the pull-up buffer TFT of the GIP on the other side. Thereafter, the sensing unit 200 may maintain the pull-up sensing switch 210 in an off state such that the second electrode of the pull-up buffer TFT T6 is floated. When the Q node voltage is applied while the second electrode of the pull-up buffer TFT T6 is being floated, source following operation is performed on the basis of the charged voltage of the scan signal reflected in the first electrode of the pull-up buffer TFT T6 and thus the potential of the second electrode rises to a potential lower than the Q node by Vth. Accordingly, the sensing unit 200 can obtain threshold voltage sensing information V_sen by connecting the second electrode of the pull-up buffer TFT T6 to the sensing line ADC.

When sensing the threshold voltage of the pull-down buffer TFT T7, the sensing unit 200 may connect the second electrode of the pull-down buffer TFT T7 to the low-potential voltage line GVSS while the scan line is charged by the scan signal. When charging of the scan signal is completed, the sensing unit 200 maintains the pull-down sensing switch 220 in the off state such that the second electrode of the pull-down buffer TFT T7 is floated. When the Qb node voltage is applied while the second electrode of the pull-down buffer TFT T7 is being floated, source following operation is performed on the basis of the charged voltage of the scan signal reflected in the first electrode of the pull-up buffer TFT T7 and thus the potential of the second electrode rises to a potential that is lower than the Qb node by Vth. Accordingly, the sensing unit 200 can obtain the threshold voltage sensing information V_sen by connecting the second electrode of the pull-down buffer TFT T7 to the sensing line ADC.

The sensing unit 200 may obtain threshold voltage information of the corresponding buffer TFT by sampling and holding the threshold voltage sensing information V_sen using an ADC. The sensing unit 200 may transmit GIP sensing information GIP_sen including the threshold voltages of the pull-up buffer TFT T6 and the pull-down buffer TFT T7 to the compensation unit 300.

The compensation unit 300 may generate a compensation value for the high-potential voltage GVDD applied to the GIP including the corresponding buffer TFT according to the GIP sensing information GIP_sen.

Figure 7:
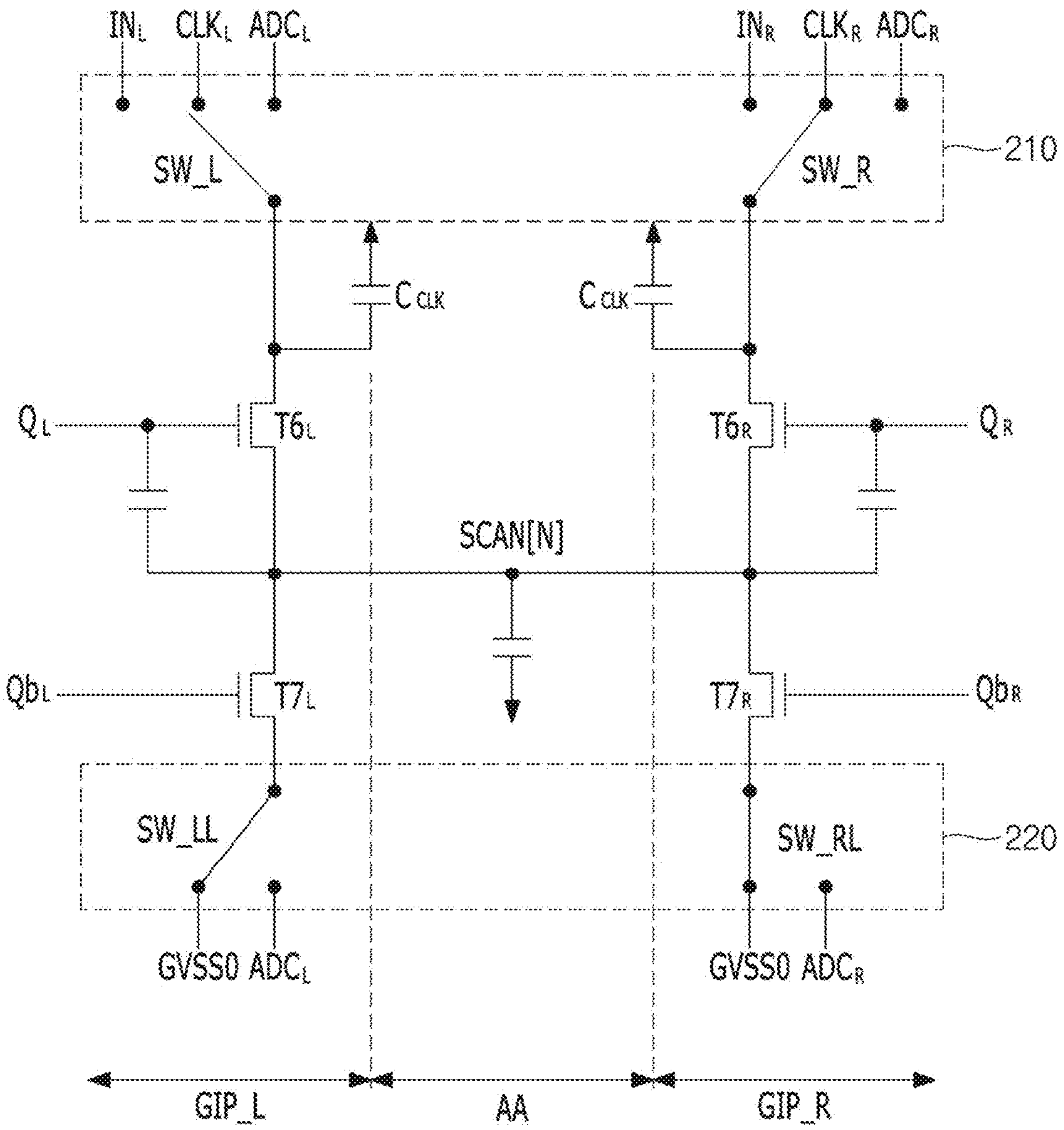
FIG. 7 is a diagram illustrating a display device according to a first embodiment.

FIG. 7 is a diagram illustrating a display device according to a first embodiment.

Referring to FIG. 7, a first GIP GIP_L and a second GIP GIP_R may be disposed on both edges (corresponding to a non-active area) of an active area AA defined in a display panel. The first GIP GIP_L and the second GIP GIP_R may alternately output scan signals according to a gate timing control signal GDC of a timing controller. The driving mode or sensing mode operation of the first GIP GIP_L and the second GIP GIP_R may be determined by the operations of a pull-up sensing switch and a pull-down sensing switch controlled by a sensing unit. When both the first GIP GIP_L and the second GIP GIP_R operate in the driving mode, they may alternately output scan signals. At the time of sensing the threshold voltage of a buffer TFT, only one side of the first GIP GIP_L and the second GIP GIP_R may operate in the driving mode to output a scan signal, and the other side may operate in the sensing mode.

The first GIP GIP_L and the second GIP GIP_R may include pull-up buffer TFTs $T6_L$ and TOR and pull-down buffer TFTs $T7_L$ and $T7_R$, respectively.

The pull-up buffer TFTs $T6_L$ and TOR and the pull-down buffer TFTs $T7_L$ and $T7_R$ may be connected to an N-th gate line crossing the active area AA. The pull-up buffer TFTs $T6_L$ and TOR and the pull-down buffer TFTs $T7_L$ and $T7_R$ may be controlled by Q node voltages $Q_L$ and $Q_R$ and Qb node voltages $Qb_L$ and $Qb_R$, respectively. The pull-up buffer TFTs $T6_L$ and TOR and the pull-down buffer TFTs $T7_L$ and $T7_R$ may output a scan signal SCAN[N] at an on voltage (e.g., high voltage) and an off voltage (e.g., low voltage). For example, the pull-up buffer TFTs $T6_L$ and TOR may output a scan signal SCAN[N] at the on voltage, and the pull-down buffer TFTs $T7_L$ and $T7_R$ may output a scan signal SCAN[N] at the off voltage.

The first GIP GIP_L and the second GIP GIP_R may include pull-up sensing switches SW_L and SW_R disposed between the signal lines of the pull-up buffer TFTs $T6_L$ and $T6_R$ and pull-down sensing switches SW_LL and SW_RL disposed between the power lines of the pull-down buffer TFTs $T7_L$ and $T7_R$. The pull-up sensing switches SW_L and SW_R and the pull-down sensing switches SW_LL and SW_RL may be controlled by a sensing unit which will be described below to perform a selective switching operation.

The pull-up sensing switches SW_L and SW_R may include a first pull-up sensing switch SW_L and a second pull-up sensing switch SW_R. The pull-down sensing switches SW_LL and SW_RL may include a first pull-down sensing switch SW_LL and a second pull-down sensing switch SW_RL.

The first pull-up sensing switch SW_L may be disposed on a first pull-up line of the first pull-up buffer TFT $T6_L$ included in the first GIP GIP_L, and the second pull-up sensing switch SW_R may be disposed on a second pull-up line of the second pull-up buffer TFT TOR included in the second GIP GIP_R.

The first pull-up sensing switch SW_L may be controlled to connect the second electrode of the first pull-up buffer TFT $T6_L$ to one selected from a first initialization line $IN_L$, a first clock line $CLK_L$, and a first sensing line $ADC_L$ disposed outside the display panel, or to be electrically floated.

When the first pull-up sensing switch SW_L is connected to the first initialization line $IN_L$, a first initialization voltage can be applied to the second electrode of the first pull-up buffer TFT $T6_L$. When the first pull-up sensing switch SW_L is connected to the first clock line $CLK_L$, a first clock signal can be applied to the second electrode of the first pull-up buffer TFT $T6_L$. When the first pull-up sensing switch SW_L is connected to the first sensing line $ADC_L$, sensing of the threshold voltage of the first pull-up buffer TFT $T6_L$ can be performed through the first sensing line $ADC_L$.

The second pull-up sensing switch SW_R may be controlled to connect the second electrode of the second pull-up buffer TFT $T6_R$ to one selected from a second initialization line $IN_R$, a second clock line $CLK_R$, and a second sensing line $ADC_R$ disposed outside the display panel, or to be electrically floated.

When the second pull-up sensing switch SW_R is connected to the second initialization line $IN_R$, a second initialization voltage can be applied to the second electrode of the second pull-up buffer TFT $T6_R$. When the second pull-up sensing switch SW_R is connected to the second clock line $CLK_R$, a second clock signal can be applied to the second electrode of the second pull-up buffer TFT $T6_R$. When the second pull-up sensing switch SW_R is connected to the second sensing line $ADC_R$, sensing of the threshold voltage of the second pull-up buffer TFT $T6_R$ can be performed through the second sensing line $ADC_R$.

The first pull-down sensing switch SW_LL may be disposed on a first pull-down line of the first pull-down buffer TFT $T7_L$ included in the first GIP GIP_L, and the second pull-down sensing switch SW_RL may be disposed on a second pull-down line of the second pull-down buffer TFT $T7_R$ included in the second GIP GIP_R.

The first pull-down sensing switch SW_LL may be controlled to connect the second electrode of the first pull-down buffer TFT $T7_L$ to one selected from a first low-potential voltage line GVSS0 and the first sensing line $ADC_L$ disposed outside the display panel or to be electrically floated.

When the first pull-down sensing switch SW_LL is connected to the first low-potential voltage line GVSS0, a first low-potential voltage GVSS0 can be applied to the second electrode of the first pull-down buffer TFT $T7_L$. When the first pull-down sensing switch SW_LL is connected to the first sensing line $ADC_L$, sensing of the threshold voltage of the first pull-down buffer TFT $T7_L$ can be performed through the first sensing line $ADC_L$.

The second pull-down sensing switch SW_RL may be controlled to connect the second electrode of the second pull-down buffer TFT $T7_R$ to one selected from the first low-potential voltage line GVSS0 and the second sensing line $ADC_R$ disposed outside the display panel or to be electrically floated.

When the second pull-down sensing switch SW_RL is connected to the first low-potential voltage line GVSS0, the first low-potential voltage GVSS0 can be applied to the second electrode of the second pull-down buffer TFT $T7_R$. When the second pull-down sensing switch SW_RL is connected to the second sensing line $ADC_R$, sensing of the threshold voltage of the second pull-down buffer TFT $T7_R$ can be performed through the second sensing line $ADC_R$.

Figure 8:
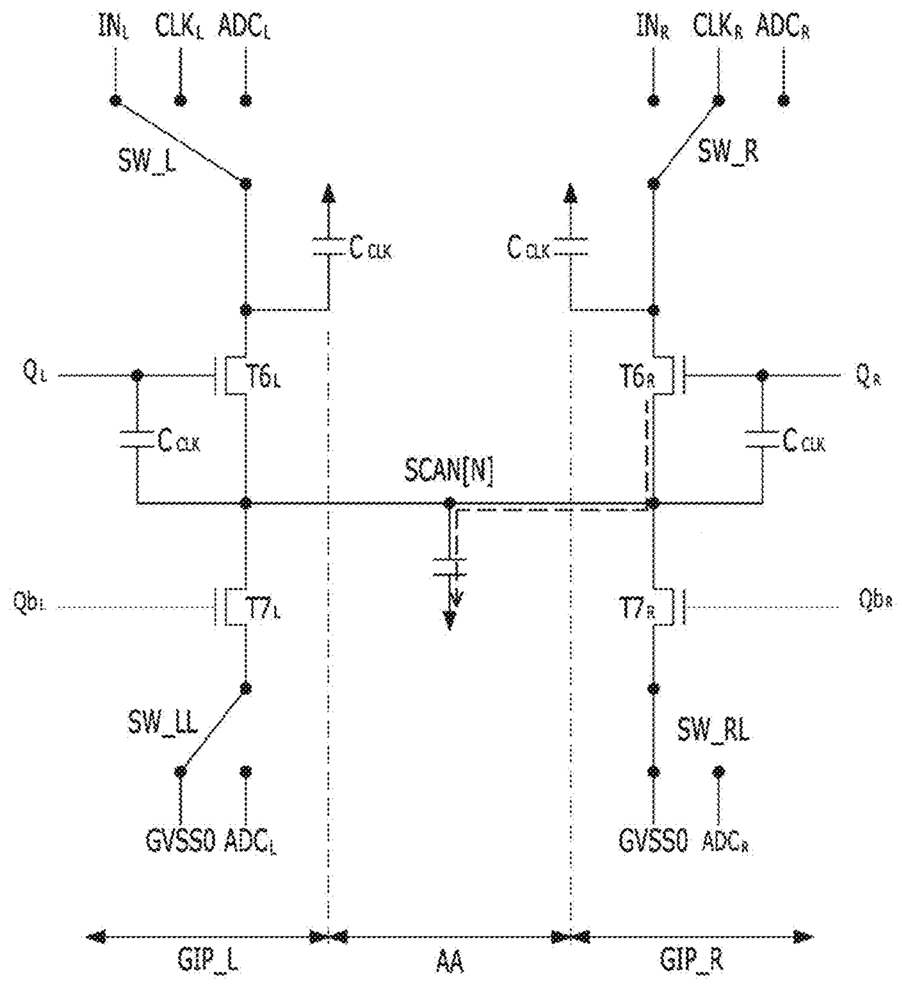
FIG. 8 to FIG. 10 are diagrams illustrating a method of sensing a threshold voltage variation of a pull-up buffer TFT.
Figure 9:
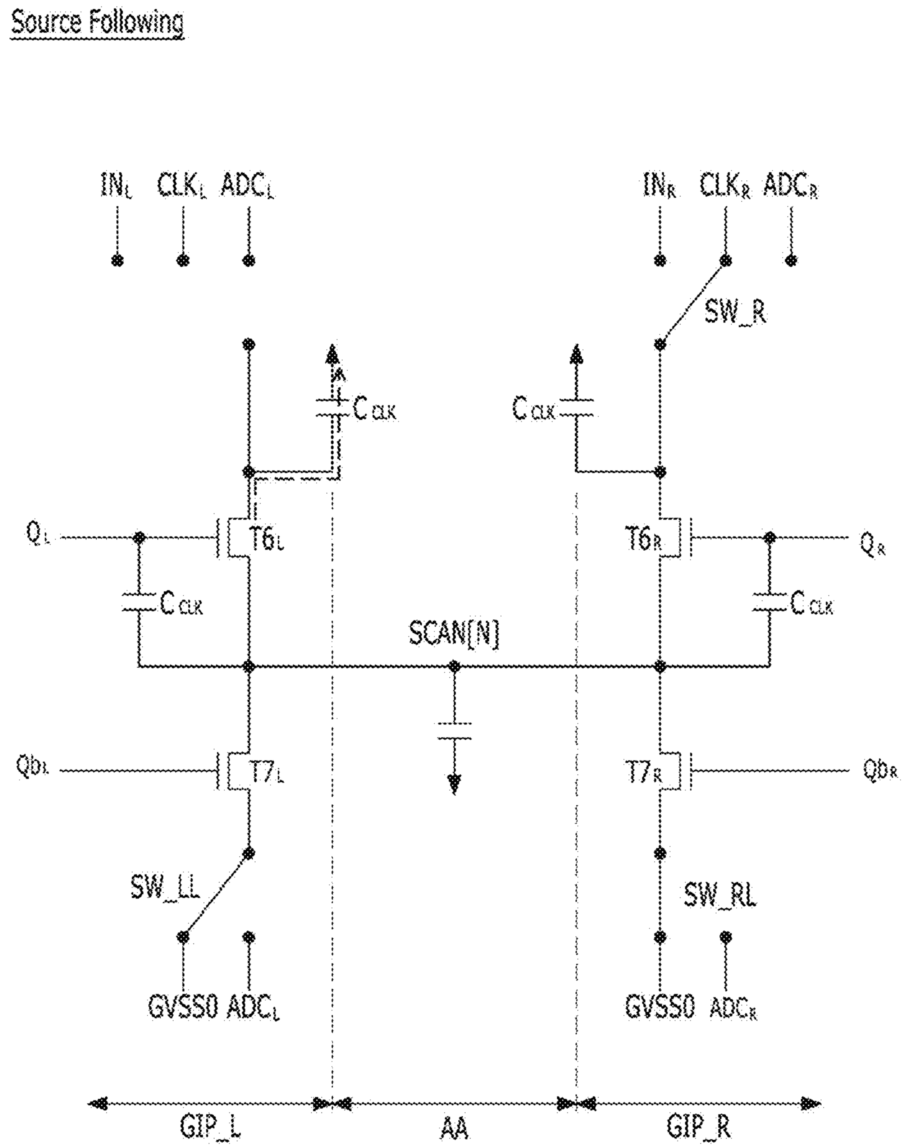
Figure 10:
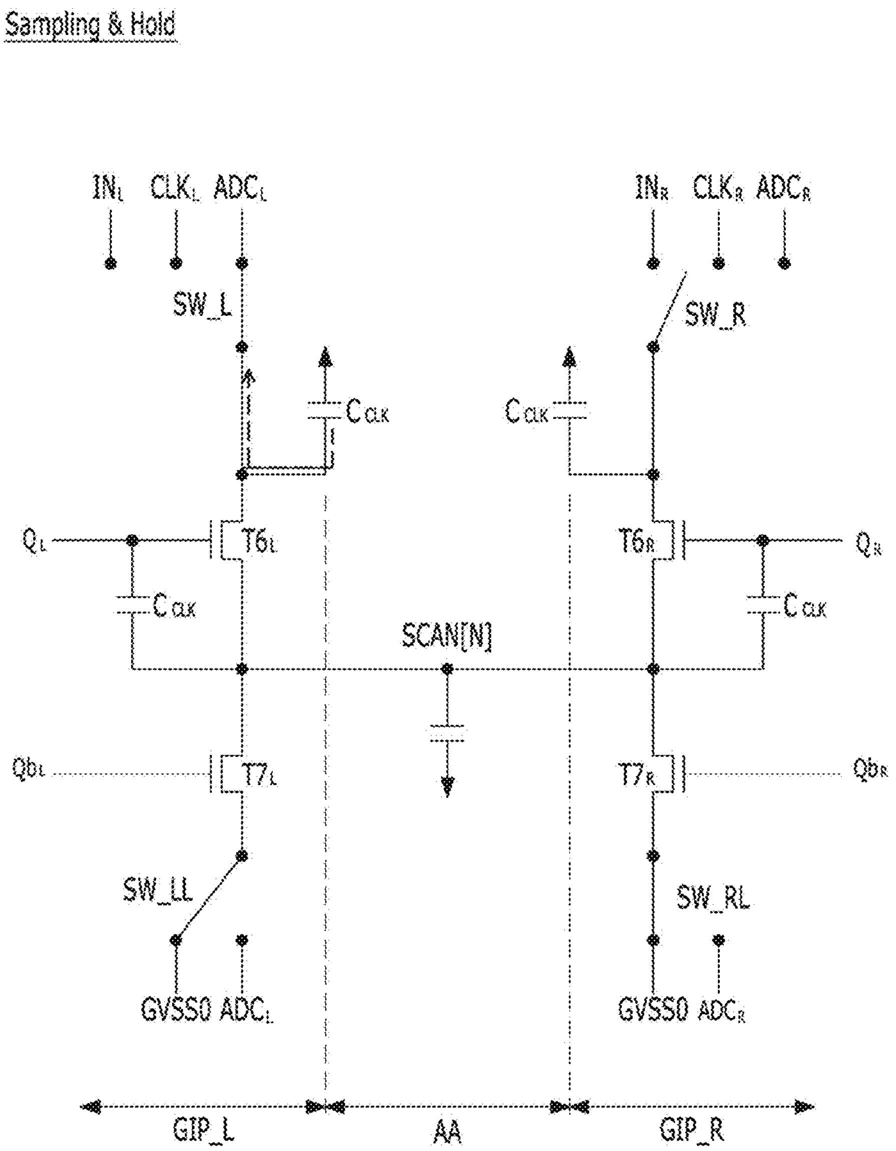

FIG. 8 to FIG. 10 are diagrams illustrating a pull-up buffer TFT sensing method.

As illustrated in FIG. 8 to FIG. 10, the display device according to the embodiment may sense a threshold voltage variation of a pull-up buffer TFT included in one selected from the first GIP GIP_L and the second GIP GIP_R through scan line charging, source following, and sampling & holding. To this end, one (sensing target) selected from the first GIP GIP_L and the second GIP GIP_R can be in a non-driven state in which it does not output a scan signal. Hereinafter, an example of a case in which the second GIP GIP_R is unilaterally driven to sense the first pull-up buffer TFT $T6_L$ included in the first GIP GIP_L will be described.

During scan line charging illustrated in FIG. 8, the first pull-up sensing switch SW_L included in the first GIP GIP_L may be connected to the first initialization line $IN_L$, and the second pull-up sensing switch SW_R may be connected to the second clock line $CLK_R$.

According to the operation of the first pull-up sensing switch SW_L included in the first GIP GIP_L, the first initialization voltage can be applied to the first pull-up line connected to the first pull-up buffer TFT $T6_L$. The line capacitor $C_{CLK}$ (or parasitic capacitor) of the first pull-up line can be initialized based on the first initialization voltage.

The second clock signal can be applied to the second pull-up line connected to the second pull-up buffer TFT $T6_R$ according to the operation of the second pull-up sensing switch SW_R included in the second GIP GIP_R, and the second pull-up buffer TFT TOR can be turned on in response to the voltage charged in a second Q node $Q_R$ and output a scan signal SCAN[N] at the on voltage on the basis of the second clock signal. When the scan signal SCAN[N] is output, the corresponding scan line can be charged to a high voltage. Accordingly, the high voltage can be applied to the drain node of the first pull-up buffer TFT $T6_L$ of the first GIP GIP_L. Meanwhile, since the first GIP GIP_L and the second GIP GIP_R alternately output scan signals, the first Q node voltage $Q_L$ of the first GIP GIP_L is maintained to be low at the timing when the second GIP GIP_R outputs the scan signal SCAN[N], and thus the first pull-up buffer TFT $T6_L$ is maintained in an off state. During a source following stage illustrated in FIG. 9, the first pull-up sensing switch SW_L may be electrically floated, and the second pull-up sensing switch SW_R may be maintained in a state in which it is connected to the second clock line $CLK_R$. After the second GIP GIP_R outputs the scan signal SCAN[N], the first Q node voltage $Q_L$ of the first GIP GIP_L can be switched to a high level. Accordingly, the pull-up buffer TFT T6 can be driven by source following on the basis of the charged voltage of the scan signal of the first electrode since the Q node voltage is applied while the second electrode is floated. During the source following stage, the potential of the second electrode of the first pull-up buffer TFT $T6_L$ can rise to a potential lower than the Q node by Vth. According to the source following operation of the first pull-up buffer TFT $T6_L$, a voltage corresponding to the threshold voltage of the first pull-up buffer TFT $T6_L$ can be charged in the line capacitor $C_{CLK}$ of the first pull-up line.

During the sampling & holding stage illustrated in FIG. 10, the first pull-up sensing switch SW_L may be connected to the first sensing line $ADC_L$, and the second pull-up sensing switch SW_R may be electrically floated. During the sampling & holding stage, the voltage charged in the line capacitor $C_{CLK}$ of the first pull-up line can be sensed by an external device connected to the first sensing line $ADC_L$ and sampled & held.

Figure 11:
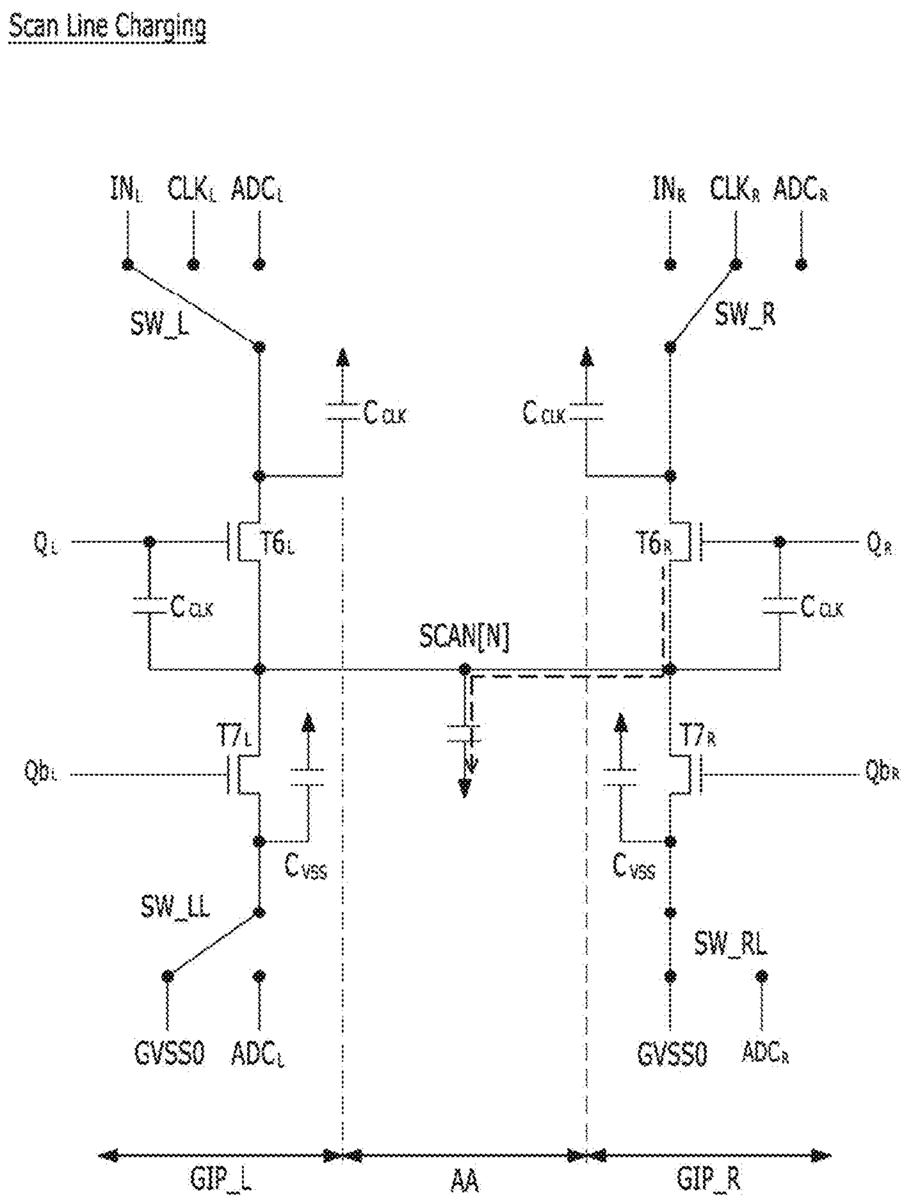
FIG. 11 to FIG. 13 are diagrams illustrating a method of sensing a threshold voltage variation of a pull-down buffer TFT.
Figure 12:
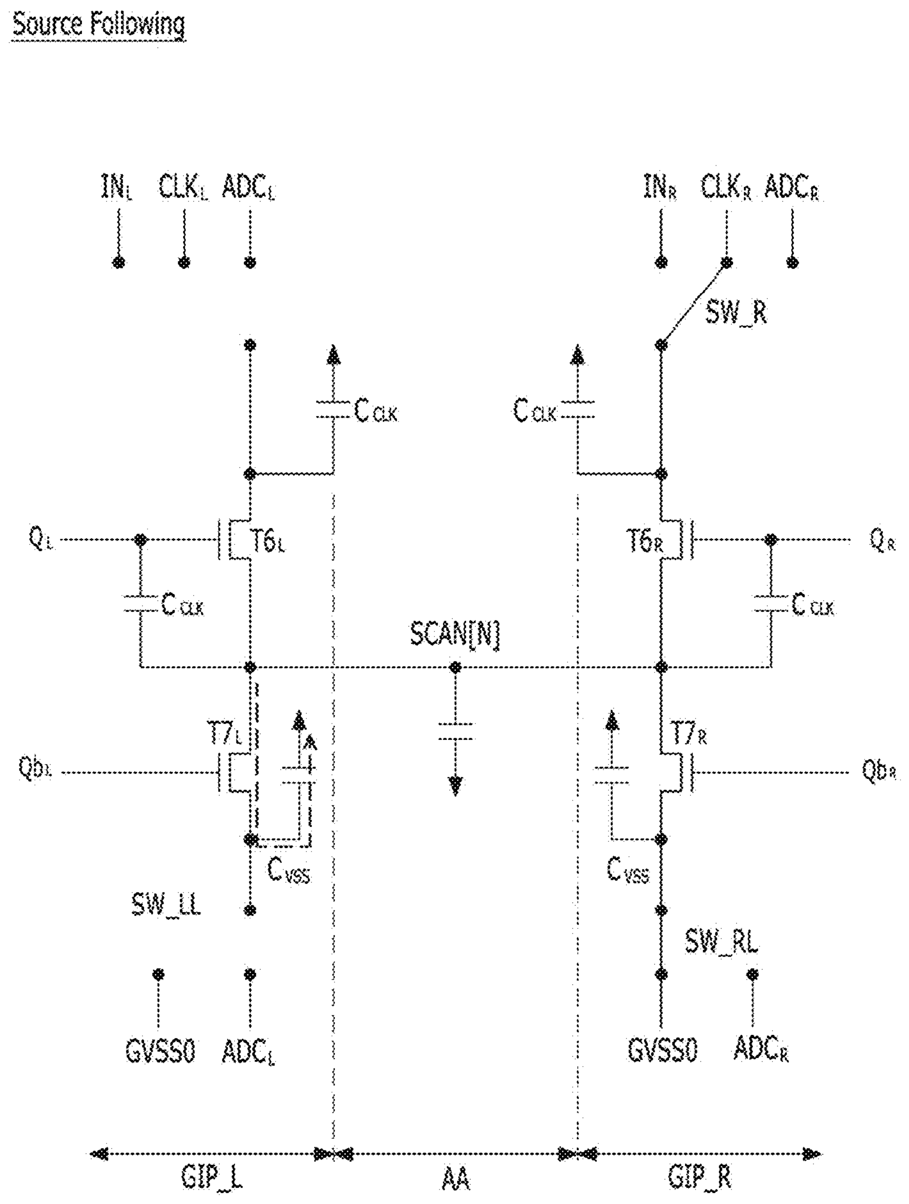
Figure 13:
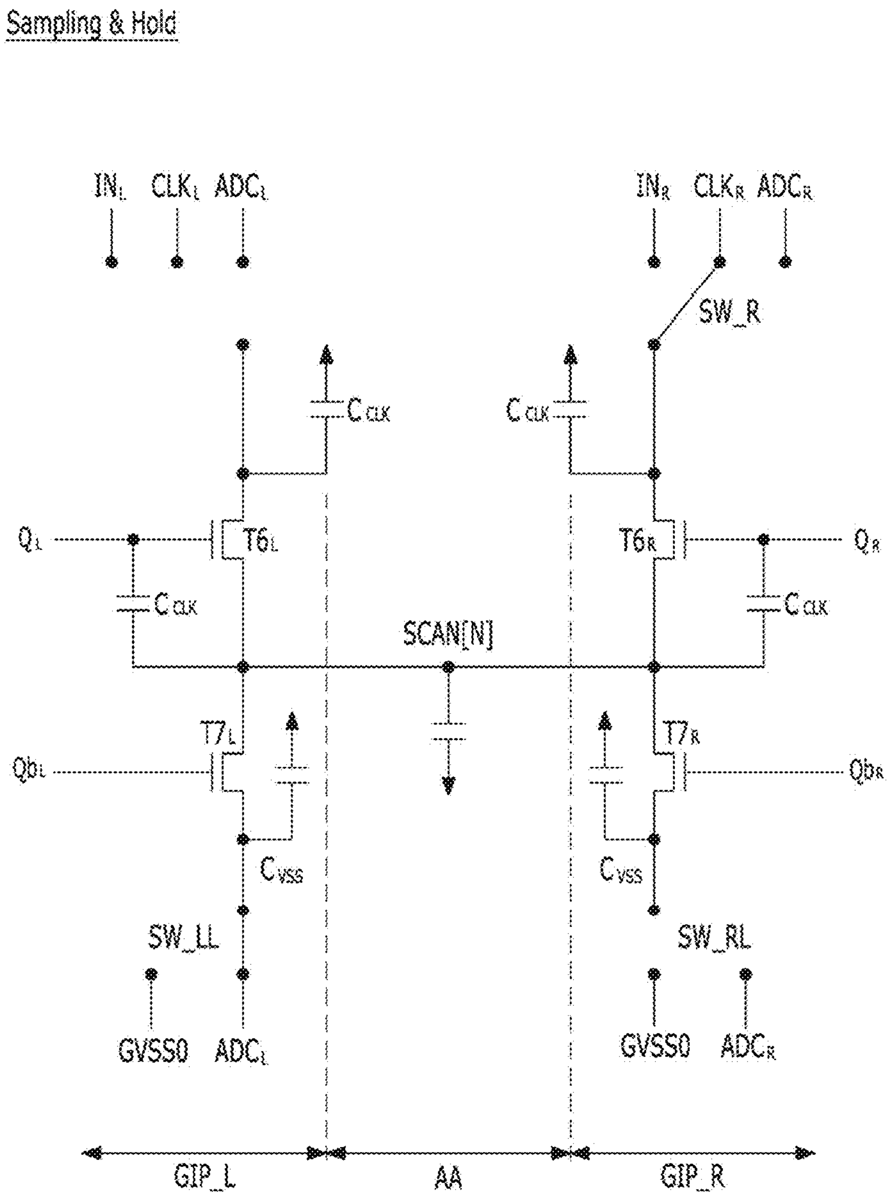

FIG. 11 to FIG. 13 are diagrams illustrating a pull-down buffer TFT sensing method.

As illustrated in FIG. 11 to FIG. 13, the display device according to the embodiment can sense a threshold voltage variation of a pull-down buffer TFT included in one selected from the first GIP GIP_L and the second GIP GIP_R through scan line charging, source following, and sampling & holding. To this end, one (sensing target) selected from the first GIP GIP_L and the second GIP GIP_R may be in a non-driven state in which it does not output a scan signal. Hereinafter, an example of sensing of the first pull-down buffer TFT $T7_L$ included in the first GIP GIP_L will be described.

During scan line charging illustrated in FIG. 11, the first pull-up sensing switch SW_L may be connected to the first initialization line $IN_L$, and the second pull-up sensing switch SW_R may be connected to the second clock line $CLK_R$. The first pull-down sensing switch SW_LL and the second pull-down sensing switch SW_RL may be connected to the first low-potential voltage line GVSS0.

According to the operation of the first pull-up sensing switch SW_L, the first initialization voltage can be applied to the first pull-up line connected to the first pull-up buffer TFT $T6_L$, and the line capacitor $C_{CLK}$ (or parasitic capacitor) of the first pull-up line can be initialized based on the first initialization voltage.

The second clock signal can be applied to the second pull-up line connected to the second pull-up buffer TFT $T6_R$ according to the operation of the second pull-up sensing switch SW_R, and the second pull-up buffer TFT $T6_R$ can be turned on in response to the voltage charged in the second Q node $Q_R$ and output a scan signal SCAN[N] at the on voltage on the basis of the second clock signal.

During source following illustrated in FIG. 12, the first pull-down sensing switch SW_LL may be electrically floated. After the second GIP GIP_R outputs a scan signal SCAN[N], the first Qb node voltage $Qb_L$ of the first GIP GIP_L may be switched to a high level. Accordingly, the first pull-down buffer TFT $T7_L$ may be driven by source following on the basis of the charged voltage of the scan signal of the first electrode since the first Qb node voltage $Qb_L$ is applied while the second electrode is floated. During the source following, the potential of the second electrode of the first pull-down buffer TFT $T7_L$ may rise to a potential lower than the Q node by Vth. According to the source following operation of the first pull-down buffer TFT $T7_L$, a line capacitor $C_{VSS}$ of the first pull-down line can be charged with a voltage corresponding to the threshold voltage of the first pull-down buffer TFT $T7_L$.

During the sampling & holding stage illustrated in FIG. 13, the first pull-up sensing switch SW_L may be electrically floated, and the second pull-up sensing switch SW_R may be maintained in a state in which it is connected to the second clock line $CLK_R$. The first pull-down sensing switch SW_LL may be connected to the first sensing line $ADC_L$, and the second pull-down sensing switch SW_RL may be electrically floated. During the sampling & holding stage, the voltage charged in the line capacitor $C_{VSS}$ of the first pull-down line can be sensed by an external device connected to the first sensing line $ADC_L$ and sampled & held.

FIG. 13 is a diagram illustrating a stage circuit of a gate driver to which a compensation circuit according to an embodiment is applicable.

As shown in FIG. 13, the gate driver to which the compensation circuit according to the embodiment is applicable may be implemented on the basis of a stage circuit including a line selector 502, a Q node controller 504, a Q node and QH node stabilizer 506, an inverter 508, a QB node stabilizer 510, a carry signal output unit 512, and a scan signal output unit 514.

The line selector 502 may charge an M node on the basis of a previous carry signal C(k−2) in response to input of a line sensing ready signal LSP. The line selector 502 may charge a Q node to the level of a first high voltage GVDD1 on the basis of the voltage charged at the M node in response to input of a reset signal RESET. The line selector 502 may discharge or reset the Q node to the level of a third low voltage GVSS3 in response to input of a panel on signal POS.

The line selector 502 may include first to seventh transistors T11 to T17 and a precharging capacitor CA. The first transistor T11 and the second transistor T12 may be connected between the M node and a first high voltage line through which the first high voltage GVDD1 is transmitted. The first transistor T11 and the second transistor T12 may be connected in series.

The first transistor T11 may output the previous carry signal C(k−2) to a first connection node NC1 in response to input of the line sensing ready signal LSP. The second transistor T12 may electrically connect the first connection node NC1 to the M node in response to input of the line sensing ready signal LSP. For example, when the line sensing ready signal LSP at a high voltage is input to the first transistor T11 and the second transistor T12, the first transistor T11 and the second transistor T12 are turned on simultaneously and thus the M node can be charged to the level of the first high voltage GVDD1.

The third transistor T13 can be turned on when the voltage level of the M node is a high level to supply the first high voltage GVDD1 to the first connection node NC1. When the first high voltage GVDD1 is supplied to the first connection node NC1, the voltage difference between the gate voltage of the first transistor T11 and the first connection node NC1 may increase. Therefore, when the low-level line sensing ready signal LSP is input to the gate of the first transistor T11 and thus the first transistor T11 is turned off, the first transistor T11 can be maintained in a completely turned off state due to the voltage difference between the gate voltage of the first transistor T11 and the first connection node NC1. Accordingly, current leakage in the first transistor T11 and the resulting voltage drop at the M node can be prevented, and the voltage of the M node can be maintained stably.

The precharging capacitor CA is connected between the M node and the first high voltage line through which the first high voltage GVDD1 is transmitted and may store the difference voltage between the first high voltage GVDD1 and the voltage charged at the M node. When the first transistor T11, the second transistor T12, and the third transistor T13 are turned on, the precharging capacitor CA can store the high voltage of the previous carry signal C(k−2). When the first transistor T11, the second transistor T12, and the third transistor T13 are turned off, the precharging capacitor CA can maintain the voltage of the M node for a certain time using the stored voltage.

The fourth transistor T14 and the fifth transistor T15 may be connected between the Q node and the first high voltage line through which the first high voltage GVDD1 is transmitted. The fourth transistor T14 and the fifth transistor T15 may be connected in series.

The fourth transistor T14 and the fifth transistor T15 can charge the Q node with the first high voltage GVDD1 in response to the voltage of the M node and input of the reset signal RESET. When the voltage of the M node is at a high level, the fourth transistor T14 is turned on to transmit the first high voltage GVDD1 to a shared node of the fourth transistor T14 and the fifth transistor T15. The fifth transistor T15 can be turned on by a high-level reset signal RESET to supply the voltage of the shared node to the Q node. Accordingly, when the fourth transistor T14 and the fifth transistor T15 are turned on simultaneously, the Q node can be charged with the first high voltage GVDD1.

The sixth transistor T16 and the seventh transistor T17 may be connected between the Q node and a third low voltage line through which the third low voltage GVSS3 is transmitted. The sixth transistor T16 and the seventh transistor T17 may be connected in series.

The sixth transistor T16 and the seventh transistor T17 can discharge the Q node to the third low voltage GVSS3 in response to input of the panel on signal POS. Discharging the Q node to the third low voltage GVSS3 may also be represented as resetting the Q node. The seventh transistor T17 can be turned on in response to input of the high-level panel on signal POS to supply the third low voltage GVSS3 to a QH node. The sixth transistor T16 can be turned on in response to input of the high-level panel on signal POS to electrically connect the Q node and the QH node. Accordingly, when the sixth transistor T16 and the seventh transistor T17 are turned on simultaneously, the Q node can be discharged or reset to the third low voltage GVSS3.

The Q node controller 504 can charge the Q node to the level of the first high voltage GVDD1 in response to input of the previous carry signal C(k−2) and discharge the Q node to the level of the third low voltage GVSS3 in response to input of a subsequent carry signal C(k+2). The Q node controller 504 may include first to eighth transistors T21 to T28.

The first transistor T21 and the second transistor T22 may be connected between the Q node and the first high voltage line through which the first high voltage GVDD1 is transmitted. The first transistor T21 and the second transistor T22 may be connected in series.

The first transistor T21 and the second transistor T22 can charge the Q node to the level of the first high voltage GVDD1 in response to input of the previous carry signal C(k−2). The first transistor T21 can be turned on in response to input of the previous carry signal C(k−2) to supply the first high voltage GVDD1 to a second connection node NC2. The second transistor T22 can be turned on in response to input of the previous carry signal C(k−2) to electrically connect the second connection node NC2 and the Q node. Accordingly, when the first transistor T21 and the second transistor T22 are turned on simultaneously, the first high voltage GVDD1 can be supplied to the Q node.

The fifth transistor T25 and the sixth transistor T26 may be connected to the third high voltage line through which the third high voltage GVDD3 is transmitted. The fifth transistor T25 and the sixth transistor T26 may supply the third high voltage GVDD3 to the second connection node NC2 in response to the third high voltage GVDD3.

The fifth transistor T25 and the sixth transistor T26 can continuously supply the third high voltage GVDD3 to the second connection node NC2 by being simultaneously turned on by the third high voltage GVDD3 to increase the voltage difference between the gate voltage of the first transistor T21 and the second connection node NC2. Therefore, when the low-level previous carry signal C(k−2) is input to the gate of the first transistor T21 and thus the first transistor T21 is turned off, the first transistor T21 can be maintained in a completely turned off state due to the voltage difference between the gate voltage of the first transistor T21 and the second connection nodes NC2. Accordingly, current leakage in the first transistor T21 and the resulting voltage drop at the Q node can be prevented, and the voltage at the Q node can be maintained stably.

For example, when the threshold voltage of the first transistor T21 is negative (−), the gate-source voltage Vgs of the first transistor T21 can be maintained as negative (−) according to the third high voltage GVDD3 supplied to the drain electrode. Therefore, when the low-level previous carry signal C(k−2) is input to the gate of the first transistor T21 and thus the first transistor T21 is turned off, the first transistor T21 is maintained in a completely turned off state, and thus occurrence of leakage current can be prevented. The third high voltage GVDD3 may be set to a lower level than the first high voltage GVDD1.

The third transistor T23 and the fourth transistor T24 may be connected between the Q node and the third low voltage line through which the third low voltage GVSS3 is transmitted. The third transistor T23 and fourth transistor T24 may be connected in series.

The third transistor T23 and the fourth transistor T24 may discharge the Q node and QH node to the level of the third low voltage GVSS3 in response to input of the subsequent carry signal C(k+2). The fourth transistor T24 can be turned on in response to input of the subsequent carry signal C(k+2) to discharge the QH node to the level of the third low voltage GVSS3. The third transistor T23 can be turned on in response to input of the subsequent carry signal C(k+2) to electrically connect the Q node and the QH node. Accordingly, when the third transistor T23 and the fourth transistor T24 are turned on simultaneously, the Q node and QH node can be discharged or reset to the level of the third low voltage GVSS3.

The seventh transistor T27 and the eighth transistor T28 may be connected between the first high voltage line through which the first high voltage GVDD1 is transmitted and the Q node and between the first high voltage line through which the first high voltage GVDD1 is transmitted and the QH node. The seventh transistor T27 and the eighth transistor T28 may be connected in series.

The seventh transistor T27 and the eighth transistor T28 may supply the first high voltage GVDD1 to the QH node in response to the voltage of the Q node. The seventh transistor T27 can be turned on when the voltage of the Q node is at a high level to supply the first high voltage GVDD1 to a shared node of the seventh transistor T27 and the eighth transistor T28. The eighth transistor T28 can be turned on when the voltage of the Q node is at a high level to electrically connect the shared node and the QH node. Accordingly, the seventh transistor T27 and the eighth transistor T28 can be turned on simultaneously when the voltage of the Q node is at a high level to supply the first high voltage GVDD1 to the QH node.

When the first high voltage GVDD1 is supplied to the QH node, the voltage difference between the gate of the third transistor T23 and the QH node may increase. Therefore, when the low-level subsequent carry signal C(k+2) is input to the gate of the third transistor T23 and thus the third transistor T23 is turned off, the third transistor T23 may be maintained in a completely turned off state due to the voltage difference between the gate voltage of the third transistor T23 and the voltage of the QH node. Accordingly, current leakage in the third transistor T23 and the resulting voltage drop at the Q node are prevented, and thus the voltage of the Q node can be maintained stably.

The Q node and QH node stabilizer 506 may discharge the Q node and QH node to the level of the third low voltage GVSS3 in response to the voltage of the QB node. The Q node and QH node stabilizer 506 may include a first transistor T31 and a second transistor T32.

The first transistor T31 and the second transistor T32 may be connected between the Q node and the third low voltage line through which the third low voltage GVSS3 is transmitted. The first transistor T31 and the second transistor T32 may be connected in series. The first transistor T31 and the second transistor T32 may discharge the Q node and QH node to the level of the third low voltage GVSS3 in response to the voltage of the QB node. The second transistor T32 is turned on when the voltage of the QB node is at a high level to supply the third low voltage GVSS3 to a shared node of the first transistor T31 and the second transistor T32. The first transistor T31 can be turned on when the voltage of the QB node is at a high level to electrically connect the Q node and the QH node. Therefore, when the first transistor T31 and the second transistor T32 are turned on simultaneously in response to the voltage of the QB node, the Q node and QH node can be discharged or reset to the level of the third low voltage GVSS3.

The inverter 508 can change the voltage level of the QB node in response to the voltage level of the Q node. The inverter 508 may include first to fifth transistors T41 to T45. The second transistor T42 and the third transistor T43 may be connected between a second high voltage line through which a second high voltage GVDD2 is transmitted and a third connection node NC3. The second transistor T42 and the third transistor T43 may be connected in series.

The second transistor T42 and the third transistor T43 can supply the second high voltage GVDD2 to the third connection node NC3 in response to the second high voltage GVDD2. The second transistor T42 can be turned on by the second high voltage GVDD2 to supply the second high voltage GVDD2 to a shared node of the second transistor T42 and the third transistor T43. The third transistor T43 can be turned on by the second high voltage GVDD2 to electrically connect the shared node of the second transistor T42 and the third transistor T43 to the third connection node NC3. Therefore, when the second transistor T42 and the third transistor T43 are simultaneously turned on by the second high voltage GVDD2, the third connection node NC3 can be charged to the level of the second high voltage GVDD2.

The fourth transistor T44 may be connected between the third connection node NC3 and the second low voltage line through which the second low voltage GVSS2 is transmitted. The fourth transistor T44 can supply the second low voltage GVSS2 to the third connection node NC3 in response to the voltage of the Q node. The fourth transistor T44 can be turned on when the voltage of the Q node is at a high level to discharge or reset the third connection node NC3 to the second low voltage GVSS2.

The first transistor T41 may be connected between the QB node and the second high voltage line through which the second high voltage GVDD2 is transmitted. The first transistor T41 can supply the second high voltage GVDD2 to the QB node in response to the voltage of the third connection node NC3. The first transistor T41 can be turned on when the voltage of the third connection node NC3 is at a high level to charge the QB node to the level of the second high voltage GVDD2.

The fifth transistor T45 may be connected between the QB node and the third low voltage line through which the third low voltage GVSS3 is transmitted. The fifth transistor T45 can supply the third low voltage GVSS3 to the QB node in response to the voltage of the Q node. The fifth transistor T45 can be turned on when the voltage of the Q node is at a high level to discharge or reset the QB node to the level of the third low voltage GVSS3.

The QB node stabilizer 510 can discharge the QB node to the level of the third low voltage GVSS3 in response to input of the subsequent carry signal C(k−2), input of the reset signal, and the voltage charged at the M node. The QB node stabilizer 510 may include first to third transistors T51 to T53.

The first transistor T51 may be connected between the QB node and the second low voltage line through which the third low voltage GVSS3 is transmitted. The first transistor T51 may supply the third low voltage GVSS3 to the QB node in response to input of the subsequent carry signal C(k−2). The fifth transistor T45 can be turned on when the voltage of the Q node is at a high level to discharge or reset the QB node to the level of the third low voltage GVSS3 level.

The second transistor T52 and the third transistor T53 may be connected between the QB node and the third low voltage line through which the third low voltage GVSS3 is transmitted. The second transistor T52 and the third transistor T53 may be connected in series. The second transistor T52 and the third transistor T53 can discharge the QB node to the level of the third low voltage GVSS3 in response to input of the reset signal and the voltage charged at the M node. The third transistor T53 can be turned on when the voltage of the M node is at a high level to supply the third low voltage GVSS3 to a shared node of the second transistor T52 and the third transistor T53. The second transistor T52 can be turned on in response to input of the reset signal RESET to electrically connect the shared node of the second transistor T52 and the third transistor T53 and the QB node. Therefore, when the reset signal RESET is input while the voltage of the M node is at a high level, the second transistor T52 and the third transistor T53 are turned on simultaneously, and thus the QB node can be discharged or reset to the level of the third low voltage GVSS2.

The carry signal output unit 512 may output a carry signal C(k) on the basis of the voltage level of a carry clock signal CRCLK(k) or the level of the third low voltage GVSS3 according to the voltage level of the Q node or the voltage level of the QB node. The carry signal output unit 512 may include a first transistor T61, a second transistor T62, and a boosting capacitor CC.

The first transistor T61 may be connected between a clock signal line through which the carry clock signal CRCLK(k) is transmitted and a first output node NO1. The boosting capacitor CC may be connected between the gate and the source of the first transistor T61.

The first transistor T61 may output a high-voltage carry signal C(k) through the first output node NO1 on the basis of the carry clock signal CRCLK(k) in response to the voltage of the Q node. The first transistor T61 can be turned on when the voltage of the Q node is at a high level to supply the high-voltage carry clock signal CRCLK(k) to the first output node NO1. Accordingly, the high-voltage carry signal C(k) can be output.

When the carry signal C(k) is output, the boosting capacitor CC can bootstrap the voltage of the Q node to a boosting voltage level higher than the level of the first high voltage GVDD1 in synchronization with the high-voltage carry clock signal CRCLK(k). When the voltage of the Q node is bootstrapped, the high-voltage carry clock signal CRCLK(k) can be output as the carry signal C(k) rapidly without distortion.

The second transistor T62 may be connected between the first output node NO1 and the third low voltage line through which the third low voltage GVSS3 is transmitted. The second transistor T62 may output a low-voltage carry signal C(k) through the first output node NO1 on the basis of the third low voltage GVSS3 in response to the voltage of the QB node. The second transistor T62 can be turned on when the voltage of the QB node is at a high level to supply the third low voltage GVSS3 to the first output node NO1. Accordingly, a low-voltage carry signal C(k) can be output.

The scan signal output unit 514 may output a plurality of scan signals SCOUT(i), SCOUT(i+1), SCOUT(i+2), and SCOUT(i+3) on the basis of the voltage levels of a plurality of scan clock signals SCCLK(i) (i being a positive integer), SCCLK(i+1), SCCLK(i+2), and SCCLK(i+3) or the level of the first low voltage transmitted through the first low voltage lines GVSS1A to GVSS1D according to the voltage level of the Q node or the voltage level of the QB node. The scan signal output unit 514 may include first to eighth transistors T71 to T78 and boosting capacitors CS1, CS2, CS3, and CS4. The first to eighth transistors T71 to T78 can be divided into pull-up buffer TFTs and pull-down buffer TFTs.

The first transistor T71, the third transistor T73, the fifth transistor T75, and the seventh transistor T77 may be connected between clock signal lines through which the scan clock signals SCCLK(i), SCCLK(i+1), SCCLK(i+2), and SCCLK(i+3) are transmitted and second to fifth output nodes NO2 to NO5, respectively. The boosting capacitors CS1, CS2, CS3, and CS4 may be connected between the gates and sources of the first transistor T71, the third transistor T73, the fifth transistor T75, and the seventh transistor T77, respectively.

The first transistor T71, the third transistor T73, the fifth transistor T75, and the seventh transistor T77 may output high-voltage scan signals SCOUT(i), SCOUT(i+1), SCOUT (i+2), and SCOUT(i+3) through the second output node NO2, the third output node NO3, the fourth output node NO4, and the fifth output node NO5 on the basis of the scan clock signals SCCLK(i), SCCLK(i+1), SCCLK(i+2), and SCCLK(i+3) in response to the voltage of the Q node, respectively. The first transistor T71, the third transistor T73, the fifth transistor T75, and the seventh transistor T77 can be turned on when the voltage of the Q node is at a high level to supply the high-voltage scan clock signals SCCLK(i), SCCLK(i+1), SCCLK(i+2), and SCCLK(i+3) to the second output node NO2, the third output node NO3, the fourth output node NO4, and the fifth output node NO5, respectively. Accordingly, the high-voltage scan signals SCOUT (i), SCOUT(i+1), SCOUT(i+2), and SCOUT(i+3) can be output.

When the scan signals SCOUT(i), SCOUT(i+1), SCOUT (i+2), and SCOUT(i+3) are output, the boosting capacitors CS1, CS2, CS3, and CS4 can bootstrap or increase the voltage of the Q node to the boosting voltage level higher than the level of the first high voltage GVDD1 in synchronization with the high-voltage scan clock signals SCCLK(i), SCCLK(i+1), SCCLK(i+2), and SCCLK(i+3). When the voltage of the Q node is bootstrapped, the high-voltage scan clock signals SCCLK(i), SCCLK(i+1), SCCLK(i+2), and SCCLK(i+3) can be output as the scan signals SCOUT(i), SCOUT(i+1), SCOUT(i+2), and SCOUT(i+3) rapidly without distortion.

The second transistor T72, the fourth transistor T74, the sixth transistor T76, and the eighth transistor T78 may output low-voltage scan signals SCOUT(i), SCOUT(i+1), SCOUT(i+2), and SCOUT(i+3) through the second output node NO2, the third output node NO3, the fourth output node NO4, and the fifth output node NO5 on the basis of the first low voltage GVSS1 in response to the voltage of the QB node, respectively. The second transistor T72, the fourth transistor T74, the sixth transistor T76, and the eighth transistor T78 can be turned on when the voltage of the QB node is at a high level to supply the first low voltage GVSS1 to the second output node NO2, the third output node NO3, the fourth output node NO4, and the fifth output node NO5, respectively. Accordingly, low-voltage scan signals SCOUT (i), SCOUT(i+1), SCOUT(i+2), and SCOUT(i+3) can be output.

Figure 14:
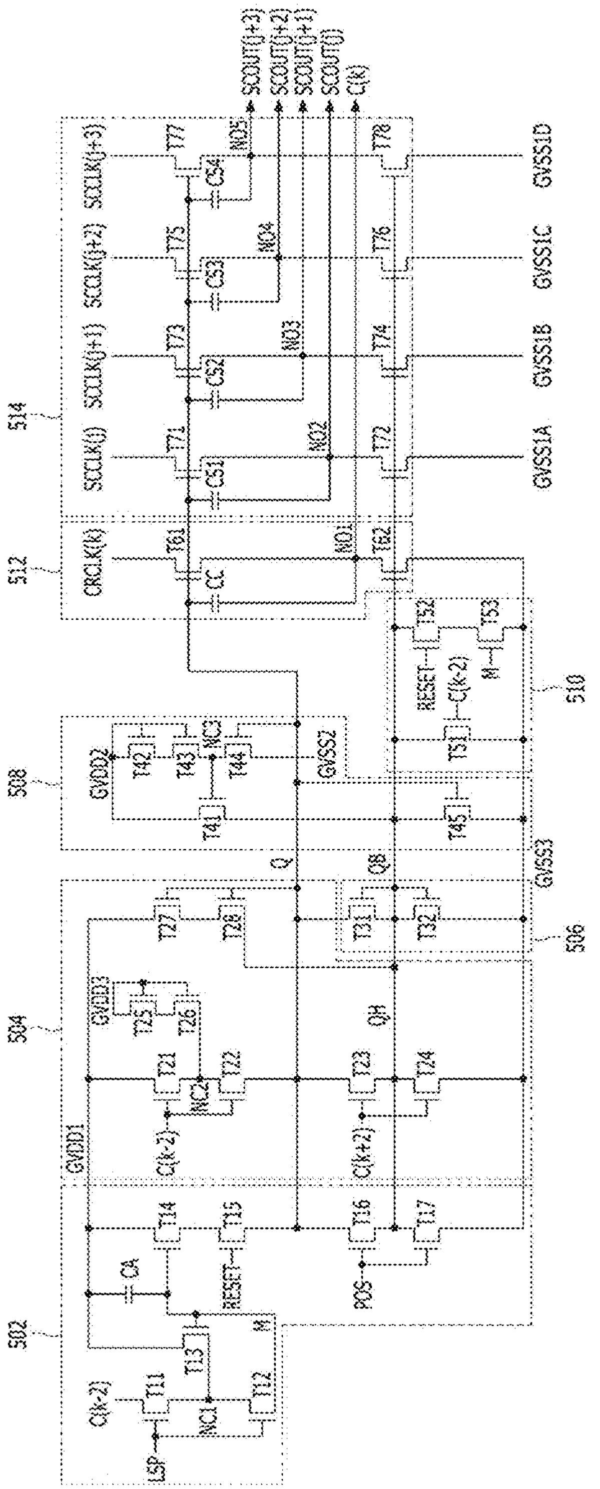
FIG. 14 is a diagram illustrating a GIP circuit included in the display device according to the first embodiment.

In FIG. 14, three high voltages GVDD1, GVDD2, and GVDD3 set to different levels and three low voltages GVSS1A to D, GVSS2, and GVSS3 set to different levels may be supplied to the stage circuit. For example, the first high voltage GVDD1 may be set to 20 V, the second high voltage GVDD2 may be set to 16 V, the third high voltage GVDD3 may be set to 14 V, the first low voltage GVSS1A to D) may be set to −6 V, the second low voltage GVSS2 may be set to −10 V, and the third low voltage GVSS3 may be set to −12 V. However, this is merely an example, and levels of high voltages and low voltages may be set differently depending on the driving method of the device, and the like.

Meanwhile, the configuration for sensing described in FIG. 7 to FIG. 13 can be applied to the scan signal output unit 514. For example, the first pull-up sensing switch SW_L and the second pull-up sensing switch SW_R in FIG. 6 may be located between the signal lines through which the scan clock signals SCCLK(i), SCCLK(i+1), SCCLK(i+2), and SCCLK(i+3) are transmitted. The first pull-down sensing switch SW_LL and the second pull-down sensing switch SW_RL in FIG. 6 may be located between low voltage lines through which the first low voltages GVSS1A to D are transmitted.

Figure 15:
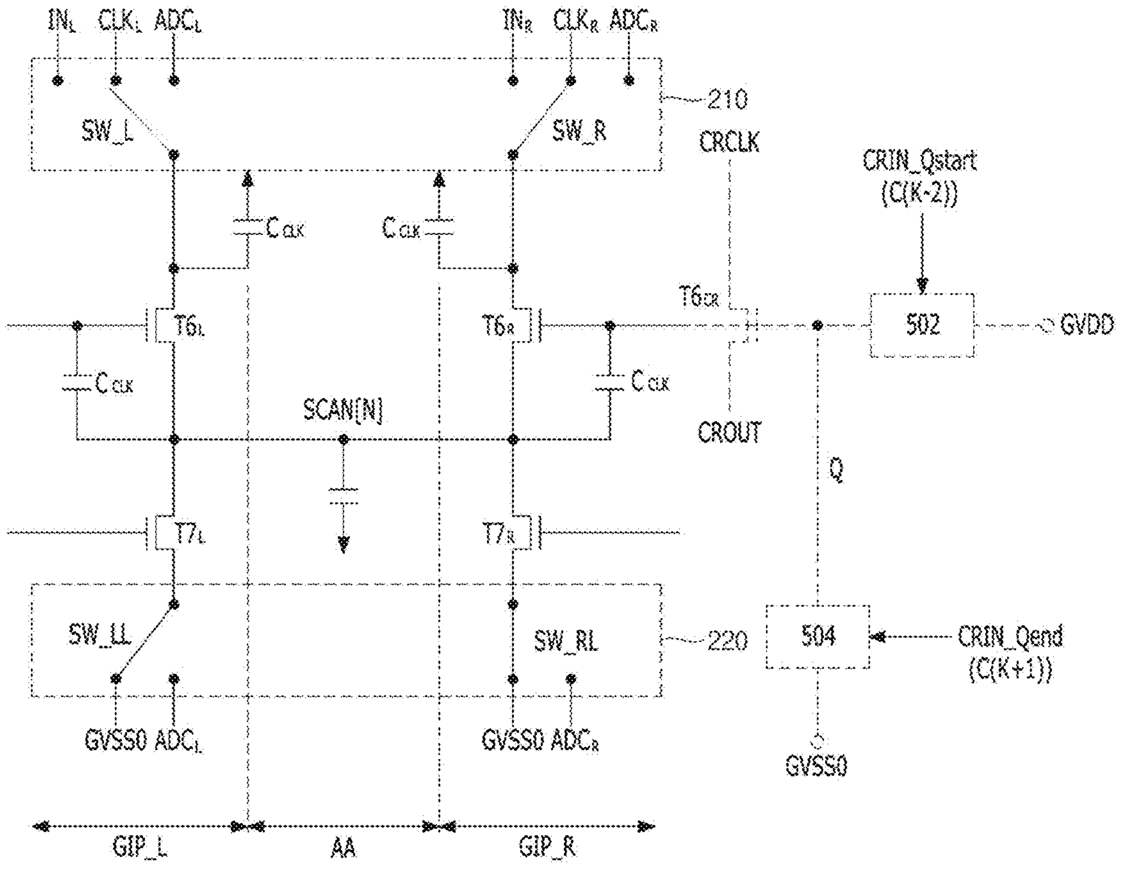
FIG. 15 and FIG. 16 are diagrams illustrating a display device according to a second embodiment.
Figure 16:
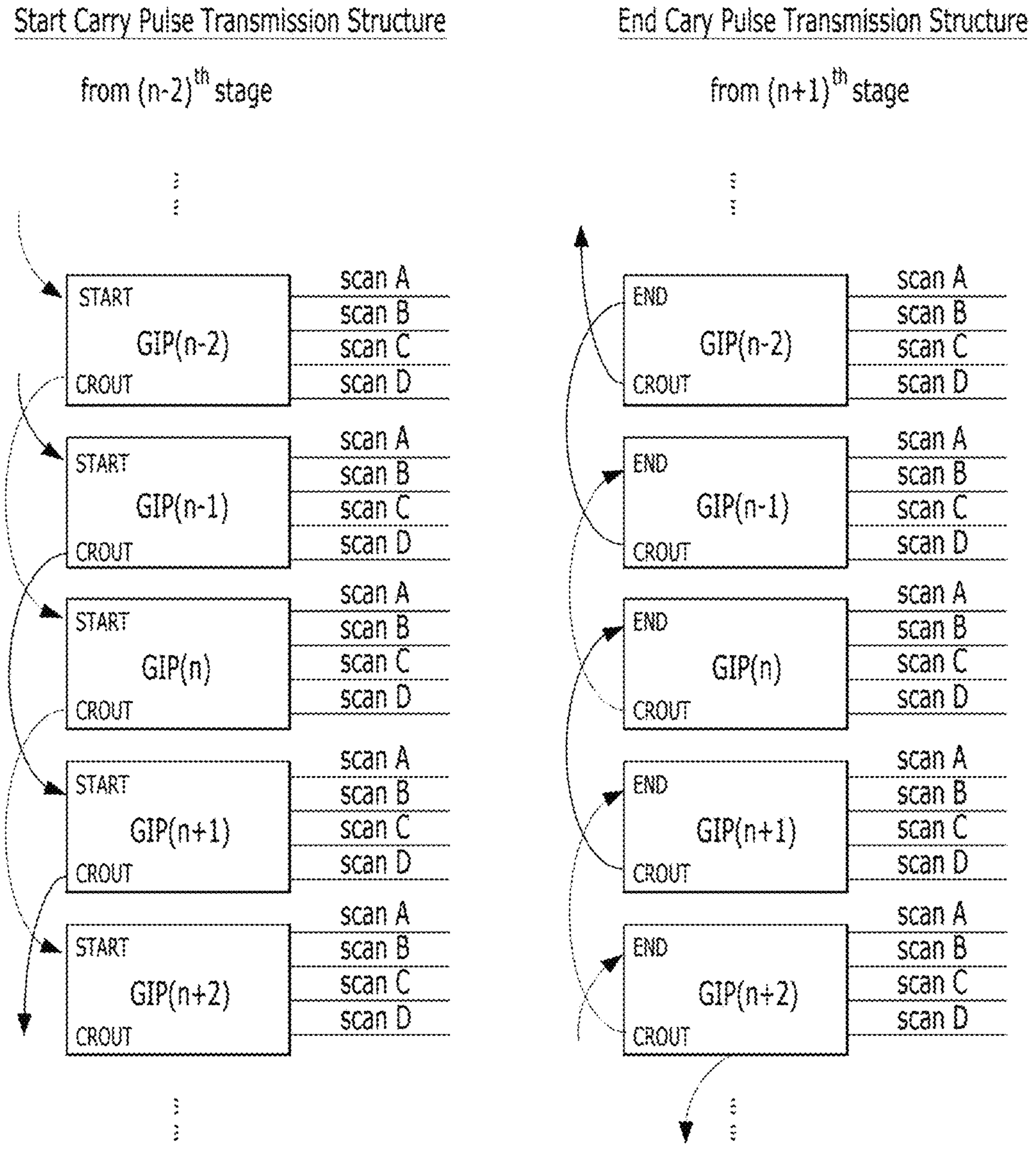

FIG. 15 and FIG. 16 are diagrams illustrating a display device according to a second embodiment. FIG. 15 is a circuit diagram for describing a GIP driving method at the time of sensing the threshold voltage of a buffer TFT in the display device according to the second embodiment. FIG. 16 is a diagram illustrating a stage connection method of the display device according to the second embodiment.

The display device according to the first embodiment of the present disclosure can operate in the driving mode by connecting a buffer TFT to a clock line or operate in the sensing mode by connecting the same to an initialization line IN or a sensing line ADC or floating the same. Since a GIP sequentially outputs scan signals, the Q node voltage is sequentially applied as a high signal. With this principle, a high-level Q node voltage can be applied to the gate electrode of a pull-up buffer TFT during the sensing mode operation in the first embodiment. Therefore, the gate electrode of the pull-up buffer TFT can be floated with the high voltage during the sensing mode operation. The display device according to the second embodiment of the present disclosure can further improve the accuracy of a sensing value by performing the process of sensing the threshold voltage of the pull-up buffer TFT in a state in which the GVDD voltage is applied to the gate electrode of the pull-up buffer TFT when sensing the threshold voltage of the pull-up buffer TFT.

FIG. 15 illustrates a case in which the threshold voltage of the pull-up buffer TFT $T6_R$ of the second GIP GIP_R is sensed in a state in which the first GIP GIP_L outputs a scan signal and the second GIP GIP_R is in a non-driving state.

Referring to FIG. 15, when the threshold voltage of the pull-up buffer TFT $T6_R$ of the second GIP GIP_R is sensed, the threshold voltage of the buffer TFT of the second GIP GIP_R can be sensed in a state in which the GVDD voltage is applied to the Q node to which the gate electrode of the pull-up buffer TFT TOR of the second GIP GIP_R is connected.

The threshold voltage of the second pull-up buffer TFT $T6_R$ may be sensed through scan line charging, source following, and sampling & holding.

The source following operation for threshold voltage sensing of the second pull-up buffer TFT $T6_R$ may be performed in the saturation region of the TFT. Therefore, in order to sense the threshold voltage Vth of the second pull-up buffer TFT $T6_R$, Vgs−Vth>Vds of the second pull-up buffer TFT $T6_R$ needs to be satisfied. When this is applied to the second GIP GIP_R in FIG. 15, the gate voltage can be represented by a Q node voltage VQ, a clock voltage VCLK, and a scan voltage VSCAN. Accordingly, if the Q node voltage VQ is maintained at GVDD and VQ-VCLK-Vth<VSCAN-VCLK is satisfied, the threshold voltage Vth of the second pull-up buffer TFT $T6_R$ can be sensed through the source following operation. This formula can be rearranged as VQ-Vt>VSCAN. In the display device according to the second embodiment, the Q node voltage VQ is fixed to GVDD during sensing of the threshold voltage of the buffer TFT, and thus the accuracy can be improved during Vth sensing and calculation.

FIG. 15 illustrates a clock input state when the Q node voltage VQ serves as GVDD in a stage having the circuit configuration of FIG. 14. As shown in FIG. 15, when a carry start signal CRIN_Qstart(C(K−2)) of the (n−2)-th stage is input to the line selector 502, the Q node voltage VQ can be maintained at GVDD during the threshold voltage sensing period of the second pull-up buffer TFT $T6_R$. Thereafter, when a carry end signal CRIN_Qend(C(K+1)) of the (n+1)-th stage is input to the Q node controller 504, the Q node voltage VQ can be discharged to GVSS0. That is, as shown in FIG. 16, by providing a configuration in which a start carry pulse is input to the (n−2)-th stage and an end carry pulse is transmitted to the (n+1)-th stage, the GVDD voltage can be applied to the gate electrode of the pull-up buffer TFT when sensing the threshold voltage of the pull-up buffer TFT.

The second embodiment of the present disclosure illustrates a case in which, the GVDD voltage is applied to the gate electrode of the pull-up buffer TFT when the threshold voltage of the pull-up buffer TFT is sensed using the start carry pulse and the end carry pulse in the stage circuit illustrated in FIG. 14. However, the circuit configuration of the stage circuit and the method of connecting the start carry pulse and the end carry pulse are not limited thereto, and various circuits and connection methods can be applied such that the GVDD voltage can be applied to the gate electrode of the pull-up buffer TFT when the threshold voltage of the pull-up buffer TFT is sensed.

Figure 17:
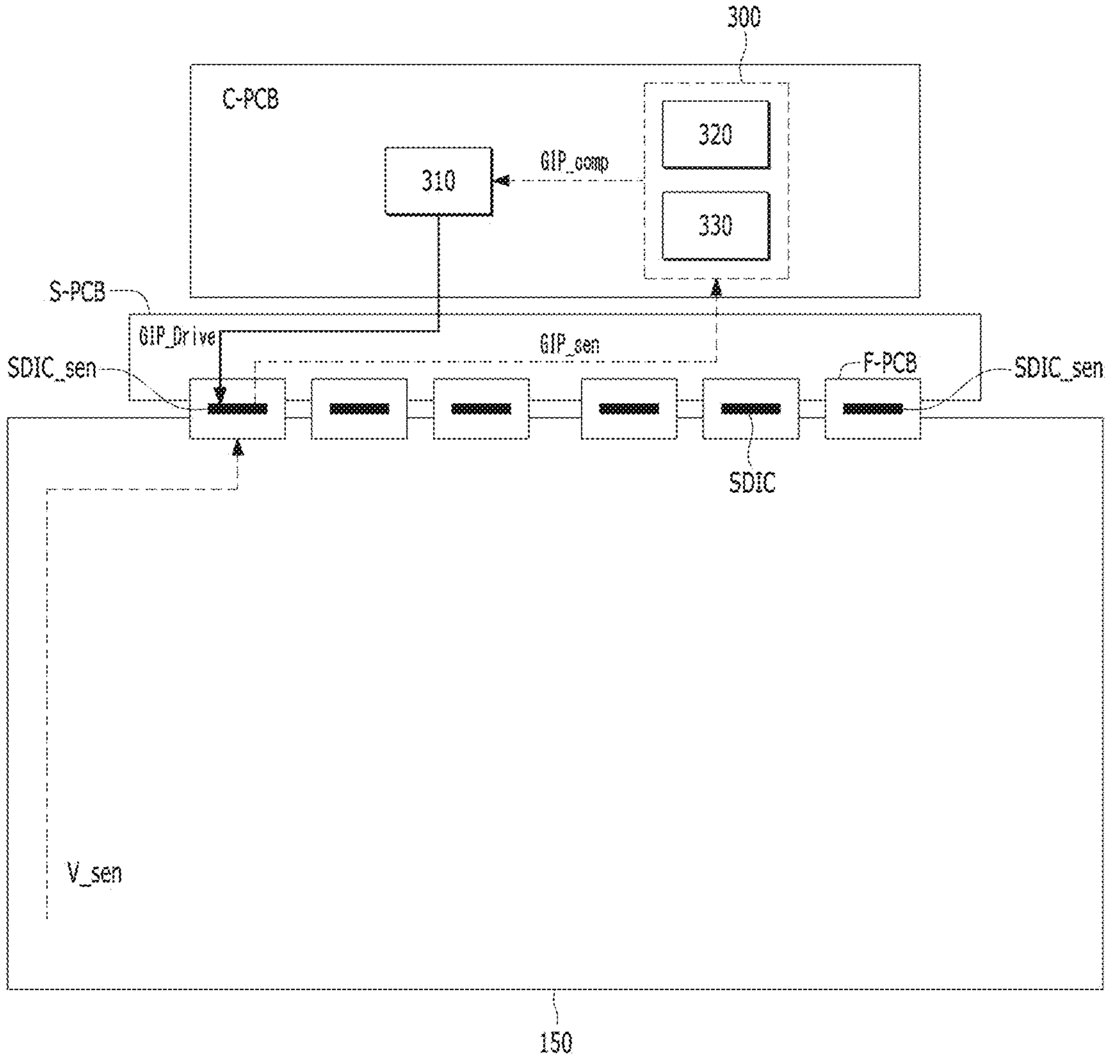
FIG. 17 is a diagram illustrating a configuration of a sensing unit according to a first embodiment of a display device according to an embodiment of the present disclosure.
Figure 18:
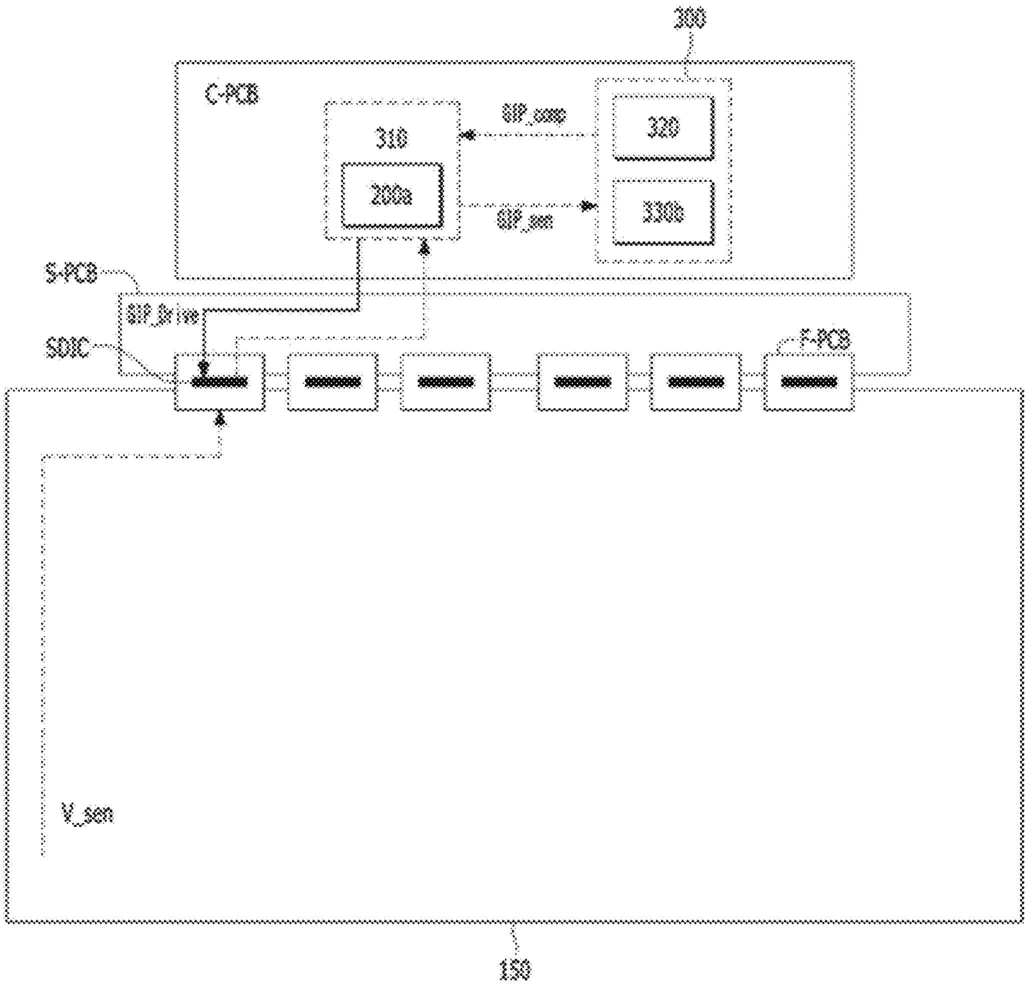
FIG. 18 is a diagram illustrating a configuration of a sensing unit according to a second embodiment of the display device according to the embodiment of the present disclosure.
Figure 19:
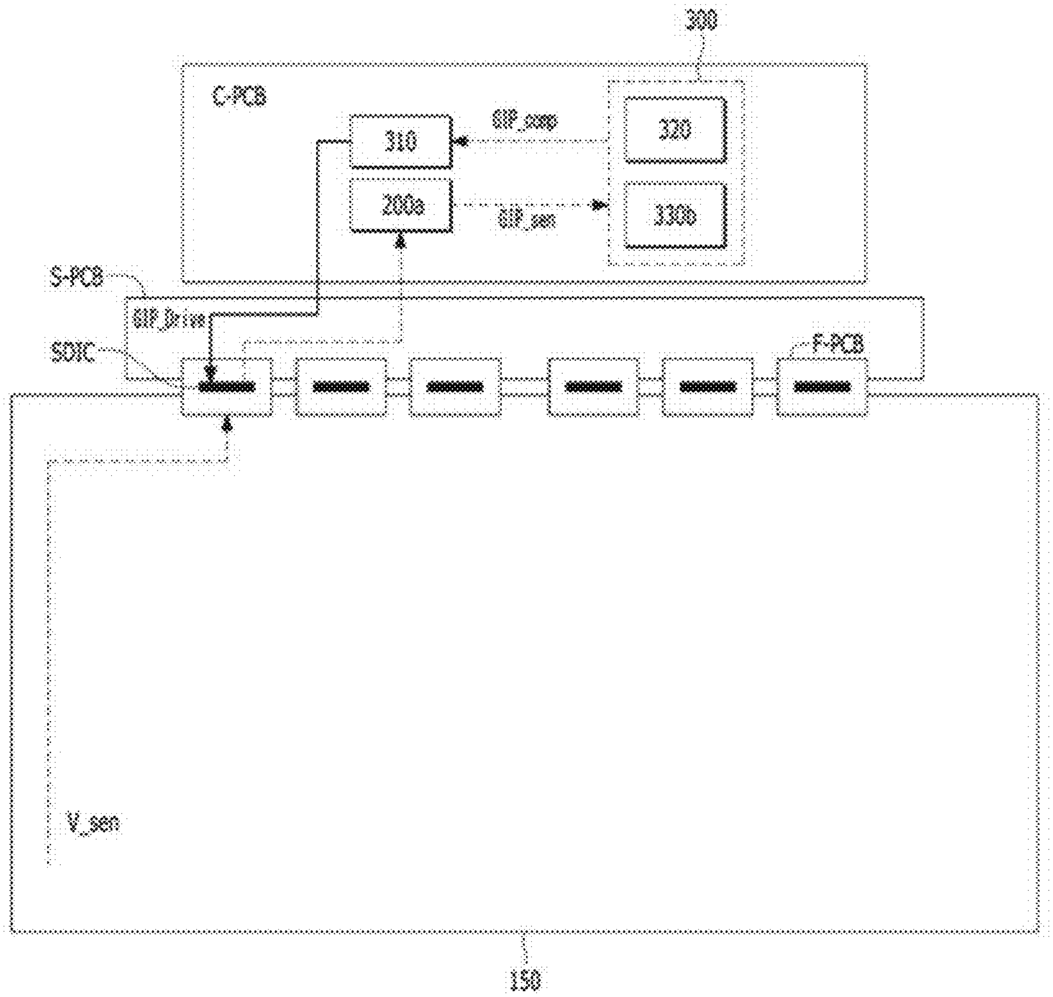
FIG. 19 is a diagram illustrating a configuration of a sensing unit according to a third embodiment of the display device according to the embodiment of the present disclosure.

FIG. 17 is a diagram illustrating some components included in the display device of the embodiment according to a first example, FIG. 18 is a diagram illustrating some components included in the display device of the embodiment according to a second example, and FIG. 19 is a diagram illustrating some components included in the display device of the embodiment according to a third example.

As shown in FIG. 17, according to the first example, the sensing unit (200, refer to FIG. 6) that obtains a sensing voltage V_Sen from a buffer TFT included in a GIP and generates GIP sensing information GIP_sen may be implemented in a data driver SDIC. SDIC_sen may be defined as a data driver including the sensing unit. The data driver SDIC_sen including the sensing unit may be disposed on both edges of a third circuit board F-PCB, but the present disclosure is not limited thereto.

The data driver SDIC_sen including the sensing unit may generate GIP sensing information GIP_sen according to the sensing voltage V_Sen received from the buffer TFT included in the GIP and transmit the same to a compensation circuit 300. The data driver SDIC_sen including the sensing unit may include a sample and hold circuit that samples and holds the sensing voltage V_Sen and a digital-to-analog converter (DAC) that converts the same into a digital signal.

The compensation circuit 300 may generate a compensation value GIP_comp for compensating for GVDD on the basis of the GIP sensing information GIP_sen, and provide the generated compensation value GIP_comp to a GIP driving circuit 310. The compensation circuit 300 may include a compensation controller 320 and a lookup table 330. The lookup table 330 may store GVDD setting values according to threshold voltage variations of buffer TFTs. The compensation controller 320 may generate the compensation value GIP_comp corresponding to the GIP sensing information GIP_sen on the basis of the lookup table 330 and provide the compensation value GIP_comp to the GIP driving circuit 310.

The GIP driving circuit 310 may output a GIP driving signal GIP_Drive by adjusting the voltage level of the GVDD supplied to the GIP according to the compensation value GIP_comp received from the compensation circuit 300. The GIP driving signal GIP_Drive may include a control signal and a voltage signal for driving the GIP.

According to the first example above, the sensing unit that generates the GIP sensing information GIP_sen can be implemented within the data driver SDIC to compensate for the voltage level of the GVDD according to a threshold voltage variation of the buffer TFT.

As illustrated in FIG. 18, according to the second example, the sensing unit (200, refer to FIG. 6) that obtains the sensing voltage V_Sen from the buffer TFT included in the GIP and generates the GIP sensing information GIP_sen may be implemented in the GIP driving circuit 310. 200*a* denotes a sensing unit included in the GIP driving circuit 310. The sensing unit 200*a* may include a sample & hold circuit that samples & holds a sensing voltage V_Sen and a DAC that converts the same into a digital signal. The GIP driving circuit 310 including the sensing unit 200*a* may be disposed on the first circuit board C-PCB, but the present disclosure is not limited thereto.

The data driver SDIC_sen may receive the sensing voltage V_Sen from the buffer TFT included in the GIP and transmit the same to the GIP driving circuit 310 including the sensing unit 200*a*.

The sensing unit 200*a* included in the GIP driving circuit 310 may generate GIP sensing information GIP_sen according to the sensing voltage V_Sen received from the buffer TFT included in the GIP and transmit the same to the compensation circuit 300.

The compensation circuit 300 may generate a compensation value GIP_comp for compensating for GVDD on the basis of the GIP sensing information GIP_sen and provide the generated compensation value GIP_comp to the GIP driving circuit 310.

The GIP driving circuit 310 may output a GIP driving signal GIP_Drive by adjusting the voltage level of GVDD supplied to the GIP according to the compensation value GIP_comp received from the compensation circuit 300.

As shown in FIG. 19, according to the third example, a sensing unit 200*b* that obtains the sensing voltage V_Sen from the buffer TFT included in the GIP and generates the GIP sensing information GIP_sen may be implemented independently. The sensing unit 200*b* may include a sample & hold circuit that samples & holds the sensing voltage V_Sen and a DAC that converts the same into a digital signal. The sensing unit 200*b* may be independently disposed in the form of a chip on the first circuit board C-PCB, but the present disclosure is not limited thereto.

The data driver SDIC_sen may receive the sensing voltage V_Sen from the buffer TFT included in the GIP and transmit the same to the GIP driving circuit 310 that includes the sensing unit 200*b*.

The sensing unit 200*b* may generate GIP sensing information GIP_sen according to the sensing voltage V_Sen received from the buffer TFT included in the GIP and transmit the same to the compensation circuit 300.

The compensation circuit 300 may generate a compensation value GIP_comp for compensating for GVDD on the basis of the GIP sensing information GIP_sen and provide the generated compensation value GIP_comp to the GIP driving circuit 310.

The GIP driving circuit 310 may adjust the voltage level of GVDD supplied to the GIP according to the compensation value GIP_comp received from the compensation circuit 300 and output the GIP driving signal GIP_Drive.

Figure 20:
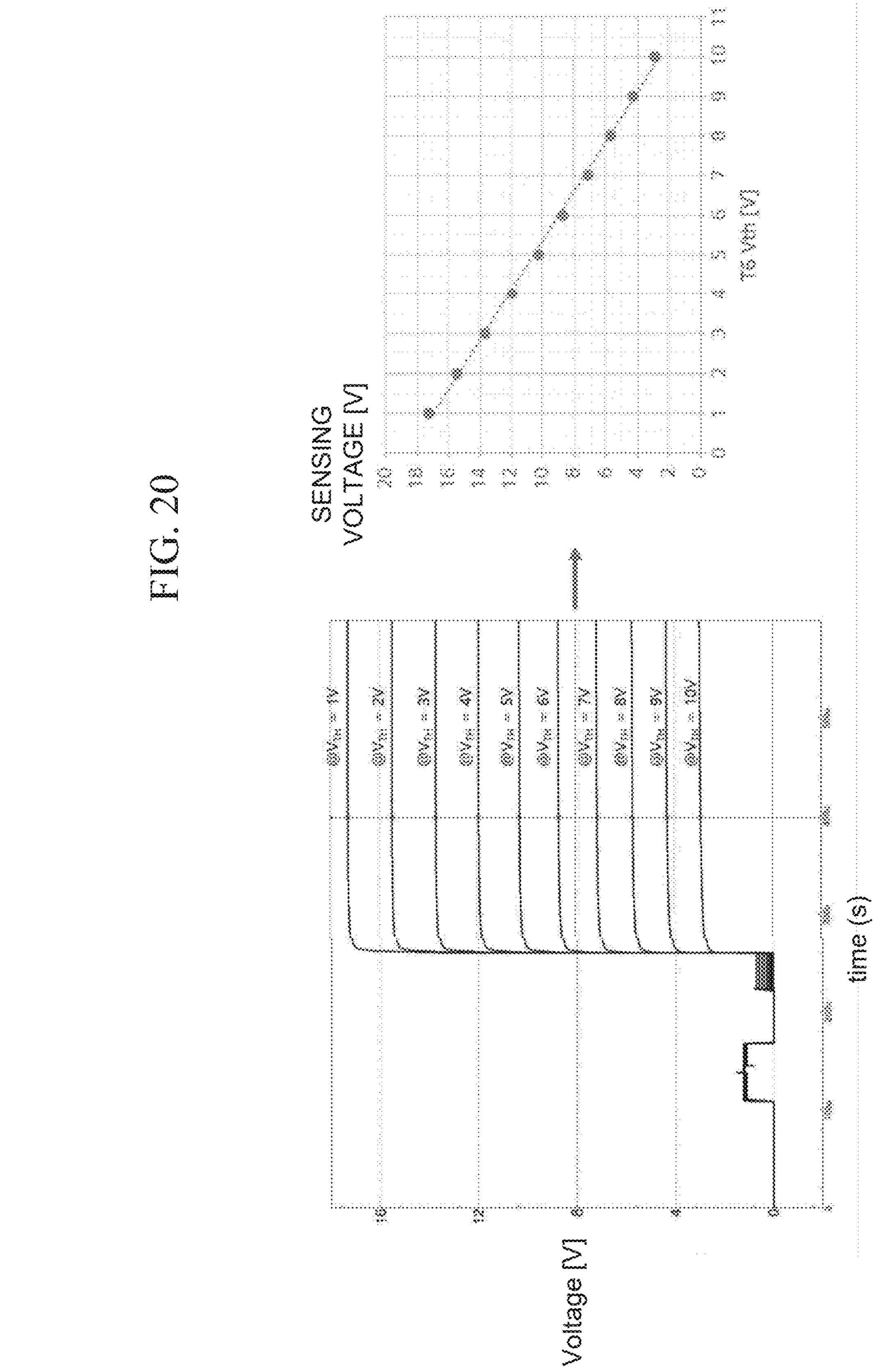
FIG. 20 is a simulation result diagram showing a change in the voltage of a clock signal according to a threshold voltage variation of a pull-up buffer TFT.

FIG. 20 illustrates example simulation results showing changes in the voltage of a clock signal according to changes in the threshold voltage of a pull-up buffer TFT.

As can be ascertained from FIG. 20, although the voltages of the Q node and the clock signal line can be maintained as the threshold voltage T6 Vth of the pull-up buffer TFT, the voltage of the Q node changes when the threshold voltage T6 Vth of the pull-up buffer TFT changes.

Figure 21:
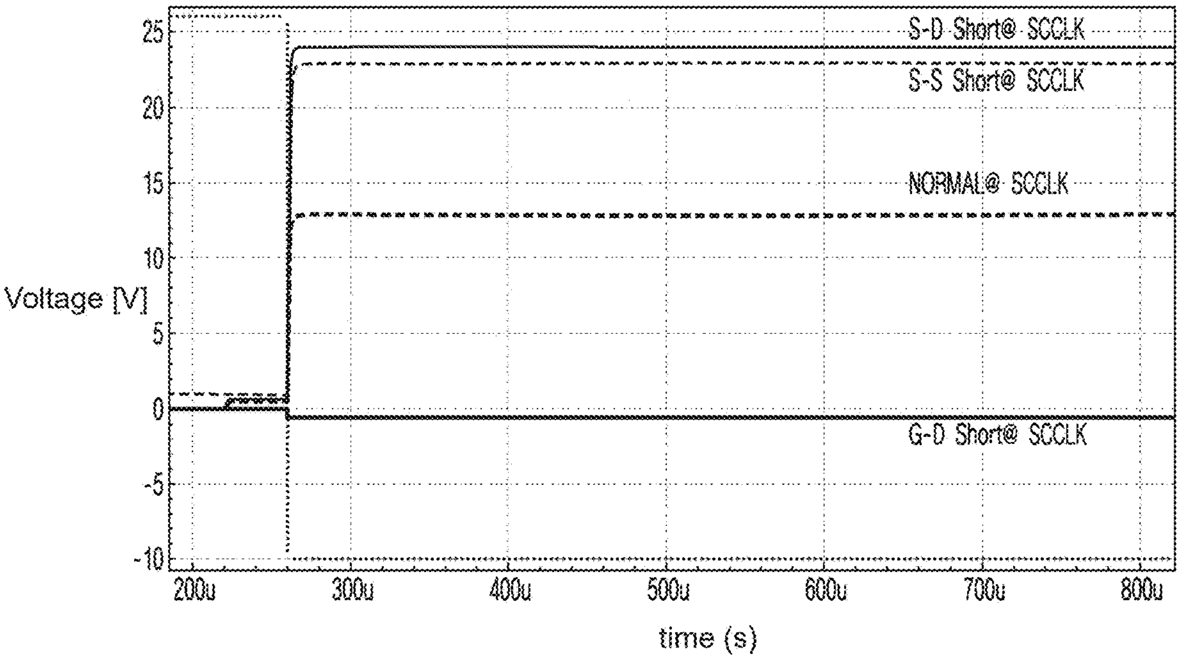
FIG. 21 is a simulation result diagram showing differences between normal and abnormal voltages detected through sensing when a strong short-circuit has occurred in the gate, drain, and source of a pull-up buffer TFT.
Figure 22:
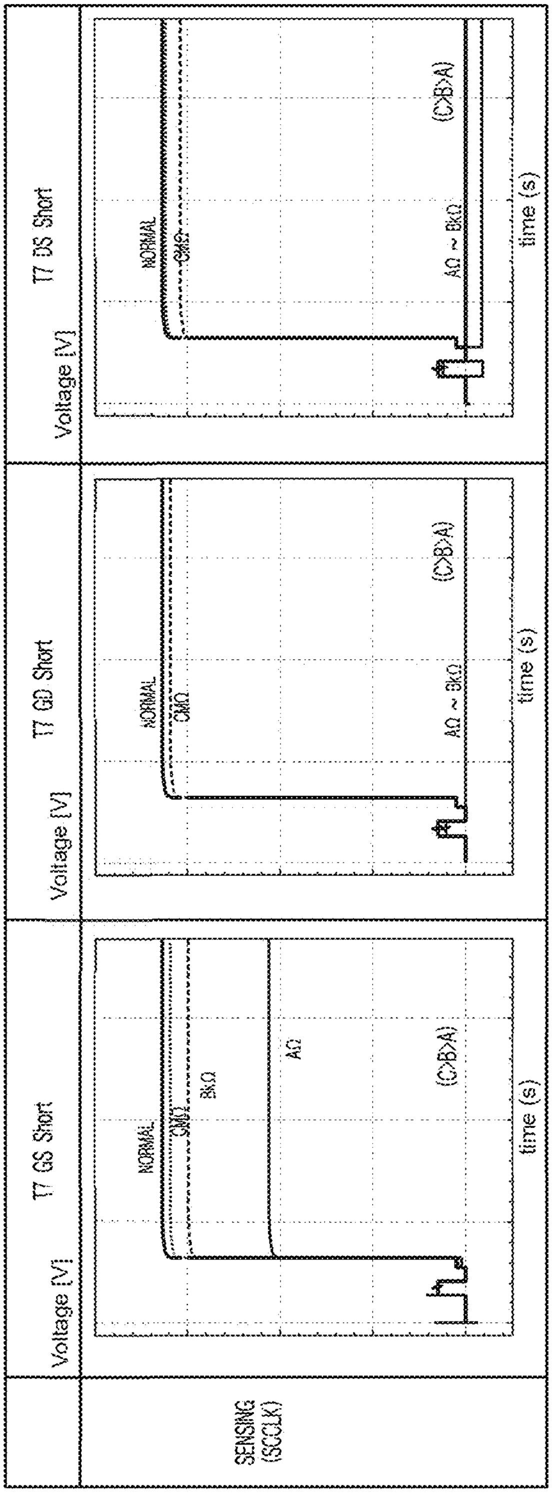
FIG. 22 is a simulation result diagram showing differences between normal and abnormal voltages detected through sensing when a short-circuit has occurred between the gate and the source, between the gate and the drain, and between the drain and the source of a pull-down buffer TFT.
Figure 23:
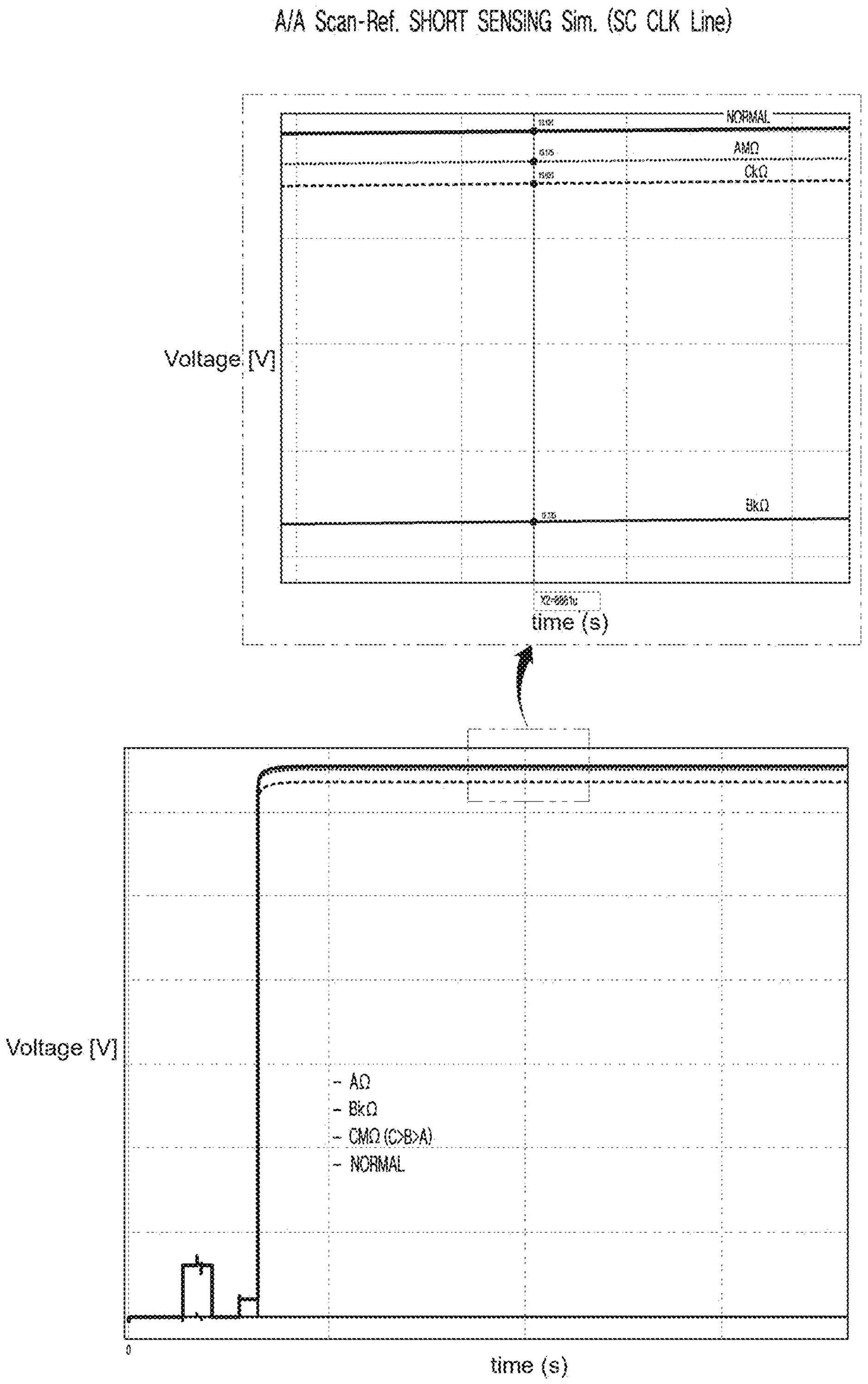
FIG. 23 is a simulation result diagram showing differences between normal and abnormal voltages detected through sensing when a short-circuit has occurred due to foreign matter in a display area.

FIG. 21 illustrates example simulation results showing differences between normal and abnormal voltages detected through sensing when a strong short-circuit has occurred in the gate, drain, and source of the pull-up buffer TFT, FIG. 22 illustrates example simulation results showing differences between normal and abnormal voltages detected through sensing when short-circuits have occurred between the gate and the source, between the gate and drain, and between the drain and the source of the pull-down buffer TFT, and FIG. 23 illustrates example simulation results showing differences between normal and abnormal voltages detected through sensing when a short-circuit has occurred due to foreign matter in a display area.

As shown in FIG. 21 to FIG. 23, the display device according to the one or more embodiments can detect whether a short-circuit has occurred in a buffer TFT, whether a defect has occurred after occurrence of a short-circuit, and whether a short-circuit has occurred due to foreign matter on the basis of a sensing value obtained from the buffer TFT included in the gate driver. Meanwhile, in FIG. 21 to FIG. 23, waveforms without "normal" mean short-circuit or abnormal. In addition, FIG. 21 to FIG. 23 should be understood as examples showing that the display device according to the embodiment can be used not only for sensing and compensation purposes, but also for detecting and responding to defects.

As described above, the present disclosure has the effects of improving driving reliability and driving stability and extending the lifespan of the device by detecting the threshold voltage of a buffer TFT included in a gate driver and compensating for at least one of signals and voltages required to drive the gate driver. In addition, the present disclosure has the effects of detecting the presence or absence of defects in at least one of signals and voltages applied to the gate driver by sensing the threshold voltage of the buffer TFT included in the gate driver and responding to defects.

Embodiments of the present disclosure can provide a display device and a method of driving the same capable of improving operation stability.

The embodiments of the present disclosure can provide a display device and a method of driving the same capable of improving operation reliability and operation stability of a gate driver by sensing and compensating for the electrical characteristics of TFTs constituting the gate driver.

The embodiments of the present disclosure can provide a display device and a method of driving the same capable of ensuring operation reliability and operation stability of the gate driver by improving the sensing accuracy of the threshold voltage of a TFT included in the gate driver.

The effects according to the present disclosure are not limited to the description above, and more diverse effects are included in the present disclosure.

It will be apparent to those skilled in the art that various modifications and variations can be made in the present disclosure without departing from the spirit or scope of the present disclosure. Thus, it is intended that the present disclosure covers the modifications and variations of the present disclosure provided they come within the scope of the appended claims and their equivalents.

What is claimed is:

1. A display device comprising:
- a display panel on which an active area including sub-pixels is formed;
- a first gate-in-panel (GIP) and a second GIP disposed on both sides of the active area, each including a buffer circuit including a plurality of buffer thin film transistors (TFTs) and outputting a scan signal to a scan line to which the sub-pixels are connected through the buffer circuit;
- a sensing switch configured to select a signal input/output to/from the buffer circuit;
- a sensing unit configured to control the sensing switch to sense a threshold voltage of a buffer TFT of the second GIP connected to the scan line on the basis of a charged voltage of the scan line charged by the scan signal output from the first GIP; and
- a compensation unit configured to generate a compensation value for a high-potential voltage applied to a relevant GIP depending on the sensed threshold voltage of the buffer TFT.

2. The display device of claim 1, wherein the sensing unit controls the sensing switch such that the buffer TFT of the second GIP performs a source following operation based on the charged voltage of the scan line to sense the threshold voltage of the buffer TFT.

3. The display device of claim 1, wherein the sensing unit senses the threshold voltage of the buffer TFT of the second GIP when the first GIP operates in a driving mode in which the first GIP outputs the scan signal.

4. The display device of claim 1, wherein the buffer circuit comprises a pull-up buffer TFT controlled by a Q node voltage input to a gate electrode of the pull-up buffer TFT to output a first scan signal through a first electrode of the pull-up buffer TFT, and a pull-down buffer TFT controlled by a QB node voltage input to a gate electrode of the pull-down buffer TFT to output a second scan signal through a first electrode of the pull-down buffer TFT, and outputs the first scan signal or the second scan signal in accordance with a clock signal.

5. The display device of claim 4, wherein the sensing switch comprises:
- a pull-up sensing switch for connecting a second electrode of the pull-up buffer TFT to one of an initialization line through which an initialization voltage is transmitted, a clock line through which the clock signal is transmitted, and a sensing line through which a sensing value is obtained or electrically floating the second electrode of the pull-up buffer TFT under the control of the sensing unit; and a pull-down sensing switch for connecting a second electrode of the pull-down buffer TFT to a low-potential voltage line through which a low-potential voltage is transmitted or a sensing line through which a sensing value is obtained or electrically floating the second electrode of the pull-down buffer TFT under the control of the sensing unit.

6. The display device of claim 5, wherein the sensing unit connects a second electrode of a pull-up buffer TFT of the second GIP connected to the scan line to the initialization line while the first GIP outputs the first scan signal or the second scan signal to the scan line, floats the second electrode of the pull-up buffer TFT of the second GIP when output of the first scan signal or the second scan signal is completed, and then obtains a threshold voltage of the pull-up buffer TFT of the second GIP according to a voltage of the second electrode of the pull-up buffer TFT of the second GIP, sensed by connecting the second electrode of the pull-up buffer TFT of the second GIP to the sensing line.

7. The display device of claim 6, wherein the pull-up buffer TFT of the second GIP performs a source following operation based on the charged voltage of the scan line reflected in a first electrode of the pull-up buffer TFT of the second GIP.

8. The display device of claim 7, wherein the pull-up buffer TFT of the second GIP receives the high-potential voltage applied to a gate electrode of the pull-up buffer TFT of the second GIP and operates in a saturation region.

9. The display device of claim 5, wherein the sensing unit connects a second electrode of a pull-down buffer TFT of the second GIP connected to the scan line to the low-potential voltage line while the first GIP outputs the first scan signal or the second scan signal to the scan line, floats the second electrode of the pull-down buffer TFT of the second GIP when output of the first scan signal or the second scan signal is completed, and then obtains a threshold voltage of the pull-down buffer TFT of the second GIP according to a voltage of the second electrode of the pull-down buffer TFT of the second GIP, sensed by connecting the second electrode of the pull-down buffer TFT of the second GIP to the sensing line.

10. The display device of claim 9, wherein the pull-down buffer TFT of the second GIP performs a source following operation based on the charged voltage of the scan line reflected in a first electrode of the pull-down buffer TFT of the second GIP.

11. The display device of claim 5, wherein the sensing unit connects the second electrode of the pull-up buffer TFT of the first GIP to the clock line and connects the second electrode of the pull-down buffer TFT of the first GIP to the low-potential voltage line while the first GIP outputs the first scan signal or the second scan signal to the scan line.

12. A method of driving a display device including a display panel on which an active area including sub-pixels is formed, a first GIP and a second GIP disposed on both sides of the display panel, each including a buffer circuit including a plurality of buffer TFTs and outputting a scan signal to a scan line to which the sub-pixels are connected through the buffer circuit, the method comprising:

outputting a scan signal to a scan line from the first GIP;

sensing a threshold voltage of a buffer TFT of the second GIP connected to the scan line on the basis of a charged voltage of the scan line charged by the scan signal; and generating a correction value for a high-potential voltage applied to a relevant GIP depending on the sensed threshold voltage of the buffer TFT.

13. The method of claim 12, wherein the buffer circuit comprises:

a pull-up buffer TFT controlled by a Q node voltage input to a gate electrode of the pull-up buffer TFT to output a first scan signal through a first electrode of the pull-up buffer TFT; and a pull-down buffer TFT controlled by a QB node voltage input to a gate electrode to of the pull-down buffer TFT output a second scan signal through a first electrode of the pull-down buffer TFT.

14. The method of claim 13, wherein the sensing a threshold voltage of a buffer TFT of the second GIP comprises:

applying an initialization voltage to a second electrode of a pull-up buffer TFT of the second GIP connected to the scan line while the first GIP outputs the first scan signal or the second scan signal to the scan line;

floating the second electrode of the pull-up buffer TFT of the second GIP when output of the first scan signal or the second scan signal is completed; and obtaining a threshold voltage of the pull-up buffer TFT of the second GIP according to a voltage of the second electrode of the pull-up buffer TFT of the second GIP, sensed by connecting the second electrode of the pull-up buffer TFT of the second GIP to a sensing line.

15. The method of claim 13, wherein the sensing a threshold voltage of a buffer TFT of the second GIP comprises:

applying a low-potential voltage to a second electrode of a pull-down buffer TFT of the second GIP connected to the scan line while the first GIP outputs the first scan signal or the second scan signal to the scan line;

floating the second electrode of the pull-down buffer TFT of the second GIP when output of the first scan signal or the second scan signal is completed; and obtaining a threshold voltage of the pull-down buffer TFT of the second GIP according to a voltage of the second electrode of the pull-down buffer TFT of the second GIP, sensed by connecting the second electrode of the pull-down buffer TFT of the second GIP to a sensing line.

16. The method of claim 13, wherein the outputting a scan signal to a scan line from the first GIP comprises connecting a second electrode of a pull-up buffer TFT of the first GIP to a clock line and connecting a second electrode of a pull-down buffer TFT of the first GIP to a low-potential voltage line.

* * * * *